United States Patent
Cai et al.

(10) Patent No.: US 11,422,800 B2
(45) Date of Patent: Aug. 23, 2022

(54) IDENTIFYING AND QUANTIFYING ARCHITECTURAL DEBT AND DECOUPLING LEVEL: A METRIC FOR ARCHITECTURAL MAINTENANCE COMPLEXITY

(71) Applicants: Drexel University, Philadelphia, PA (US); University of Hawaii, Honolulu, HI (US)

(72) Inventors: Yuanfang Cai, Paoli, PA (US); Lu Xiao, Philadelphia, PA (US); Frederick Kazman, Pittsburgh, PA (US); Ran Mo, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 16/063,501

(22) PCT Filed: Dec. 19, 2016

(86) PCT No.: PCT/US2016/067595
§ 371 (c)(1),
(2) Date: Jun. 18, 2018

(87) PCT Pub. No.: WO2017/106863
PCT Pub. Date: Jun. 22, 2017

(65) Prior Publication Data
US 2018/0374024 A1     Dec. 27, 2018

Related U.S. Application Data

(60) Provisional application No. 62/269,559, filed on Dec. 18, 2015.

(51) Int. Cl.
*G06F 8/77* (2018.01)
*G06Q 10/06* (2012.01)
(Continued)

(52) U.S. Cl.
CPC .................. *G06F 8/77* (2013.01); *G06F 8/70* (2013.01); *G06F 11/36* (2013.01);
(Continued)

(58) Field of Classification Search
CPC ... G06F 8/70; G06F 8/77; G06F 11/36; G06F 11/3616; G06F 17/16; G06F 17/18; G06Q 10/06; G06Q 10/0633; G06Q 10/06395
(Continued)

(56) References Cited

U.S. PATENT DOCUMENTS

| | | |
|---|---|---|
| 6,064,986 A | 5/2000 | Edelman |
| 8,943,464 B2 | 1/2015 | Duesterwald et al. |

(Continued)

FOREIGN PATENT DOCUMENTS

| | | |
|---|---|---|
| WO | 2014/155148 A1 | 10/2014 |
| WO | 2017/106863 A1 | 6/2017 |

OTHER PUBLICATIONS

Sethi et al., "From Retrospect to Prospect: Assessing Modularity and Stability from Software Architecture," 2009, IEEE, p. 269-272. (Year: 2009).*

(Continued)

*Primary Examiner* — Qing Chen
(74) *Attorney, Agent, or Firm* — Schott, P.C.

(57) ABSTRACT

Groups of architecturally connected files may incur and accumulate high maintenance costs as architectural debts. To quantify such debts, architectural debt, which is a term used herein, may be identified, quantified, measured, and modeled. A history coupling probability matrix for this purpose may search for architecture debts through the lens of 4 patterns of prototypical architectural flaws shown to correlate with reduced software quality. Further, a new architecture maintainability metric—Decoupling Level (DL)—measures how well the software can be decoupled into small and (Continued)

The DL Variation for Comm_1 independently replaceable modules. The DL metric opens the possibility of quantitatively comparing maintainability between different projects, as well as monitoring architecture decay throughout software evolution. Decoupling Level may be the only software maintainability metric that bears similarity with other metrics used in everyday life, such as the centimeter, in that it allows managers to monitor, evaluate, and compare software projects and their evolution.

9 Claims, 17 Drawing Sheets

(51) Int. Cl.
| | |
|---|---|
| G06F 11/36 | (2006.01) |
| G06F 8/70 | (2018.01) |
| G06F 17/16 | (2006.01) |
| G06F 17/18 | (2006.01) |

(52) U.S. Cl.
CPC .......... *G06F 11/3616* (2013.01); *G06F 17/16* (2013.01); *G06F 17/18* (2013.01); *G06Q 10/06* (2013.01); *G06Q 10/0633* (2013.01); *G06Q 10/06395* (2013.01)

(58) Field of Classification Search
USPC .................................................. 717/124–135
See application file for complete search history.

(56) References Cited

U.S. PATENT DOCUMENTS

| | | | | |
|---|---|---|---|---|
| 9,235,611 | B1* | 1/2016 | Murray | G06F 16/278 |
| 2004/0225597 | A1* | 11/2004 | Oppenheimer | G06Q 20/382 |
| | | | | 705/38 |
| 2006/0285598 | A1 | 12/2006 | Tulkki | |
| 2008/0092108 | A1 | 4/2008 | Corral | |
| 2012/0159420 | A1 | 6/2012 | Yassin et al. | |
| 2016/0203071 | A1 | 7/2016 | Cai et al. | |
| 2017/0060941 | A1* | 3/2017 | Yan | G06F 16/13 |
| 2018/0374024 | A1 | 12/2018 | Cai et al. | |

OTHER PUBLICATIONS

"Announcing Apache Wicket 8: Write Less, Achieve More," Apache Software Foundation, accessed at https://wicket.apache.org/, accessed on Mar. 24, 2019, pp. 12.
"Apache Camel," Apache Sowftware Foundation, accessed at http://camel.apache.org/, accessed on Mar. 24, 2019, pp. 5.
"Apache CXF™: An Open-Source Services Framework," accessed at http://cxf.apache.org/, accessed on Mar. 24, 2019, pp. 4.
"Apache Hadoop," accessed at https://hadoop.apache.org/, accessed on Mar. 24, 2019, pp. 5.
"Apache Mahout," accessed at http://mahout.apache.org/, accessed on Mar. 24, 2019, pp. 3.
"Apache PDFBox®—A Java PDF Library," accessed at https://pdfbox.apache.org/, accessed on Mar. 24, 2019, pp. 5.
"Continuous Code Quality," accessed at http://www.sonarqube.org/, accessed on Mar. 24, 2019, pp. 5.
"Discover, Track and Compare Open Source," accessed at https://www.openhub.net/, accessed on Mar. 24, 2019, pp. 5.
"GNU Operating System," GNU Screen, accessed at http://www.gnu.org/software/screen/, accessed on Mar. 24, 2019, pp. 2.
"ICSE Paper Data," accessed at https://www.cs.drexel.edu/~rm859/DL.php, accessed on Mar. 24, 2019, pp. 12.
"InFusion," accessed at https://web.archive.org/web/20151107032101/http://www.intooitus.com/products/infusion, accessed on Mar. 24, 2019, pp. 3.
"Replication package for ICSE Submission: Feature Decoupling Level: A Metric for Assessing an Architecture's Ability to Support Features," Updated on Aug. 2016, accessed at https://www.cs.drexel.edu/~rm859/FeatureDL.html, accessed on Mar. 24, 2019, pp. 4.
"Seventh International Workshop on Managing Technical Debt," In conjunction with ICSME 2015, accessed at https://web.archive.org/web/20150912041641/http://www.sei.cmu.edu/community/td2015/series/, accessed on Mar. 24, 2019, pp. 3.
"System Dashboard," accessed at https://issues.apache.org/jira/secure/Dashboard.jspa, accessed on Mar. 24, 2019, p. 1.
"Use ImageMagick," accessed at http://www.imagemagick.org/, accessed on Mar. 24, 2019, pp. 3.
"Welcome to Apache HBase™," accessed at http://hbase.apache.org/, accessed on Mar. 24, 2019, pp. 2.
"Welcome to the rsync web pages," accessed at https://rsync.samba.org/, accessed on Mar. 24, 2019, pp. 8.
Algorithm 2, ModelSelector (E f fortArray, T), accessed at https://www.cs.drexel.edu/~lx52/ArchDebt.html, accessed on Mar. 24, 2019, pp. 4.
Antonio, G., and Gueheneuc, Y.G., "Feature identification: a novel approach and a case study," 21st IEEE International Conference on Software Maintenance (ICSM'05), pp. 10 (2005).
Antoniol, G., and Gueheneuc, Y.G., "Feature identification: An epidemiological metaphor," IEEE Transactions on Software Engineering, vol. 32, No. 9, pp. 627-641 (2006).
Apache, "What is Cassandra?," accessed at http://cassandra.apache.org/, accessed on Mar. 24, 2019, pp. 3.
Apel, S., et al., "Exploring feature interactions in the wild: The new feature-interaction challenge," In Proceedings of the 5th International Workshop on Feature-Oriented Software Development, pp. 1-8 (2013).
Apel, S., et al., "Feature-interaction detection based on feature-based specifications," Computer Networks, vol. 57, No. 12, pp. 2399-2409 (2013).
Batory, D., et al., "Features, modularity, and variation points," In Proceedings of the 5th International Workshop on Feature-Oriented Software Development, pp. 9-16 (2013).
Beck, F., et al., "Rethinking user interfaces for feature location," In Proceedings of the 2015 IEEE 23rd International Conference on Program Comprehension, pp. 151-162 (2015).
Bertrand, M., "Object-oriented Software Construction," 2nd ed., PrenticeHall, Inc., pp. 1370 (1997).
Bouwers, E., et al., "Dependency profiles for software architecture evaluations," In Proc. 27thIEEE International Conference on Software Maintenance, pp. 540-543 (2011).
Bouwers, E., et al., "Quantifying the encapsulation of implemented software architectures," In IEEE International Conference on Software Maintenance and Evolution, pp. 211-220 (2014).
Cai, Y., and Sullivan, K.J., "Modularity analysis of logical design models," 21st IEEE/ACM International Conference on Automated Software Engineering (ASE'06), pp. 91-102 (2006).
Cai, Y., et al., "Leveraging design rules to improve software architecture recovery," In Proc. 9th International ACM Sigsoft Conference on the Quality of Software Architectures, pp. 133-142 (2013).
Cataldo, M., et al., "Software dependencies, work dependencies, and their impact on failures," IEEE Transactions on Software Engineering, vol. 35, No. 6, pp. 864-878 (2009).
Chidamber, S. R., and Kemerer, C. F., "A metrics suite for object oriented design," IEEE Transactions on Software Engineering, vol. 20, No. 6, pp. 476-493 (1994).
Curtis, B., et al., "Estimating the principal of an application's technical debt," IEEE Software, vol. 29, No. 6, pp. 34-42 (2012).
Davor, C., et al. "Hipikat: A project memory for software development," IEEE Transactions on Software Engineering, vol. 31, No. 6, pp. 446-465 (2005).
Dit, B., et al., "Feature location in source code: A taxonomy and survey," In Journal of Software Maintenance and Evolution: Research and Practice, pp. 54 (2011).
Dit, B., et al., "Integrating information retrieval, execution and link analysis algorithms to improve feature location in software," Empirical Software Engineering, vol. 18, No. 2, pp. 277-309 (2013).

(56) References Cited

OTHER PUBLICATIONS

Zazworka, N., et al., "Comparing four approaches for technical debt identification," In Software Quality Journal, vol. 22, No. 3, pp. 1-24 (2013).
Fowler, M., "A code smell is a surface indication that usually corresponds to a deeper problem in the system," published on Feb. 9, 2006, access at https://www.martinfowler.com/bliki/CodeSmell.html, accessed on Mar. 24, 2019, pp. 2.
Gall, H., et al., "Detection of logical coupling based on product release history," Proceedings. International Conference on Software Maintenance (Cat. No. 98CB36272), pp. 190-197 (1998).
Gamma, E., et al., "Design Patterns: Elements of Reusable Object-Oriented Software," Addison-Wesley, pp. 417 (1994).
Garcia, J., et al., "Identifying architectural bad smells," 2009 13th European Conference on Software Maintenance and Reengineering, pp. 255-258 (2009).
Garvin, B.J., et al., "Using feature locality: Can we leverage history to avoid failures during reconfiguration?" In Proceedings of the 8th Workshop on Assurances for Self-adaptive Systems, pp. 24-33 (2011).
Gobet, F., and Clarkson, G., "Chunks in expert memory: evidence for the magical No. four . . . or is it two?," vol. 12, No. 6, pp. 732-747 (2004).
Graves, T.L., et al., "Predicting fault incidence using software change history," IEEE Transactions on Software Engineering, vol. 26, No. 7, pp. 653-661 (2000).
Harrison, R., et al., "An investigation into the applicability and validity of object-oriented design metrics," Empirical Software Engineering, vol. 3, No. 3, pp. 255-273 (1998).
Juli, R., and Marsha, C., "A Survey of Feature Location Techniques," Domain Engineering, pp. 29-58 (2013).
Julia, R., and Marsha, C., "Locating distinguishing features using diff sets," In Proc. 27thIEEE/ACM International Conference on Automated Software Engineering, pp. 242-245 (2012).
Kazman, R., et al., "A case study in locating the architectural roots of technical debt," 2015 IEEE/ACM 37th IEEE International Conference on Software Engineering, pp. 179-188 (2015).
Li, Z., et al., "Architectural Debt Management in Value-Oriented Architecting," Economics-Driven Software Architecture, pp. 183-204 (2014).
International Search Report and Written Opinion of International Searching Authority for PCT Application No. PCT/US2016/067595 dated May 4, 2017.
Maldonado, E.Da S., and Shihab, E., "Detecting and quantifying different types of self-admitted technical debt," 2015 IEEE 7th International Workshop on Managing Technical Debt (MTD), pp. 8 (Apr. 2015).
Mccabe, T.J., "A complexity measure," IEEE Transactions on Software Engineering, vol. 2, No. 4, pp. 308-320 (1976).
Mo, R., et al., "Hotspot patterns: The formal definition and automatic detection of architecture smells," 2015 12th Working IEEE/IFIP Conference on Software Architecture, pp. 10 (2015).
Naedele, M., et al., "Manufacturing execution systems: A vision for managing software development," Journal of Systems and Software, vol. 101, pp. 59-68 (2015).
Nagappan, N., et al., "Mining metrics to predict component failures," In Proc. 28th International Conference on Software Engineering, pp. 452-461 (2006).
Nord, R., et al., "In Search of a Metric for Managing Architectural Technical Debt," 2012 Joint Working IEEE/IFIP Conference on Software Architecture and European Conference on Software Architecture, pp. 91-100 (2012).
Nouh, A., et al., "Improving feature location by enhancing source code with stereotypes," In Proc. 29thIEEE International Conference on Software Maintenance, pp. 300-309 (2013).
Ostrand, T. J., et al., "Predicting the location and number of faults in large software systems," IEEE Transactions on Software Engineering, vol. 31, No. 4, pp. 340-355 (2005).
Ran, M., et al., "Decoupling level: A new metric for architectural maintenance complexity," In Proc. 38thinternational Conference on Software Engineering, pp. 499-510 (2016).
Robillard, MP, "Topology analysis of software dependencies," ACM Transactions on Software Engineering and Methodology, vol. 17, No. 4, pp. 36 (2008).
Safyallah, H., and Sartipi, K., "Dynamic analysis of software systems using execution pattern mining," In Proc. 14th IEEE International Conference on Program Comprehension, pp. 6 (2006).
Schwanke, R., et al., "Measuring architecture quality by structure plus history analysis," In Proc. 35rd International Conference on Software Engineering, pp. 891-900 (2013).
Seaman, C., et al., "Technical debt: Beyond definition to understanding report on the sixth international workshop on managing technical debt," ACM SIGSOFT Software Engineering Notes, vol. 40, No. 2, pp. 32-34 (2015).
Sullivan, K.J., et al., "The structure and value of modularity in software design," ACM SIGSOFT Software Engineering Notes, vol. 26, No. 5, pp. 99-108 (2001).
Tim, M., et al., "Local vs. global models for effort estimation and defect prediction," In Proc. 26thIEEE/ACM International Conference on Automated Software Engineering, pp. 343-351 (2011).
Wong, S., et al., "Design rule hierarchies and parallelism in software development tasks," In Proc. 24th IEEE/ACM International Conference on Automated Software Engineering, pp. 197-208 (2009).
Wong, S., et al., "Detecting Software Modularity Violations," 2011 33rd International Conference on Software Engineering (ICSE), pp. 1-10 (2011).
Xiao, L., "Quantifying Architectural Debts," ESEC/FSE 2015 Proceedings of the 2015 10th Joint Meeting on Foundations of Software Engineering, pp. 1030-1033 (2015).
Xiao, L., et al., "Titan: A toolset that connects software architecture with quality analysis," In 22nd ACM SIGSOFT International Symposium on the Foundations of Software Engineering, pp. 763-766 (2014).
Xiao, Y.C., and Kazman, R., "Design rule spaces: A new form of architecture insight," In Proc. 36th International Conference on Software Engineering, pp. 967-977 (2014).
Maccormack, A., et al., "Exploring the structure of complex software designs: An empirical study of open source and proprietary code," Management Science, vol. 52, No. 7, pp. 1015-1030 (2006).
Fowler, M, et al., "Refactoring: Improving the Design of Existing Code," Addison-Wesley, pp. 1-150 (Jul. 1999), part 1.
Fowler, M, et al., "Refactoring: Improving the Design of Existing Code," Addison-Wesley, pp. 151-337 (Jul. 1999), part 2.

\* cited by examiner

| | | 1 | 2 | 3 | 4 | 5 | 6 | 7 |
|---|---|---|---|---|---|---|---|---|
| 1 | PDAnnotationLine | (1) | ,100% | ,100% | dp,100% | ,100% | ,100% | ,100% |
| 2 | PDAnnotationSquareCircle | ,100% | (2) | ,100% | dp,100% | ,100% | ,100% | ,100% |
| 3 | PDAnnotationFileAttachment | ,100% | ,100% | (3) | dp,100% | ,100% | ,100% | ,100% |
| 4 | PDAnnotation | dp,50% | dp,50% | dp,50% | | dp,50% | dp,50% | dp,50% |
| 5 | PDAnnotationText | ,100% | ,100% | ,100% | dp,100% | (5) | ,100% | ,100% |
| 6 | PDAnnotationLink | ,100% | ,100% | ,100% | Extend,dp,100% | ,100% | (6) | ,100% |
| 7 | PDAnnotationWidget | ,100% | ,100% | ,100% | Extend,dp,100% | ,100% | ,100% | (7) |

|  | 1 | 2 | 3 | 4 | 5 | 6 | 7 | 8 | 9 | 10 | 11 | 12 |
|---|---|---|---|---|---|---|---|---|---|---|---|---|
| 1 AbstractType | (1) | | | | | | | | | | | |
| 2 UUIDSerializer | ,100% | (2) | ,50% | | | ,100% | | ,50% | ,50% | | | |
| 3 UUIDType | ext,dp,33% | dp, | (3) | | | | ,33% | ,50% | ,50% | | | |
| 4 AbstractCell | dp,50% | | | (4) | | | | | | | | |
| 5 TypeCast | dp,33% | | ,33% | | (5) | | ,33% | ,33% | ,33% | ,33% | ,33% | ,33% |
| 6 IntegerSerializer | ,100% | ,100% | ,50% | | | (6) | | ,50% | ,50% | | | |
| 7 LongType | ext,dp,67% | | ,67% | | ,33% | | (7) | dp,67% | dp,67% | ,67% | ,33% | ,33% |
| 8 DateType | ext,dp,40% | | ,60% | | | | dp,40% | (8) | dp,60% | | | |
| 9 TimestampType | ext,dp,50% | | ,75% | | | | dp,50% | dp,75% | (9) | ,33% | | |
| 10 IntegerType | ext,dp,33% | | ,33% | | | | dp, | dp,50% | ,33% | (10) | | |
| 11 BytesType | ext,dp,50% | | | | | | | | | | (11) | |
| 12 TupleType | ext,dp,33% | | ,33% | | ,33% | | ,33% | ,33% | ,33% | ,33% | ,33% | (12) |

FIG. 4

|  | 1 | 2 | 3 | 4 | 5 | 6 |
|---|---|---|---|---|---|---|
| 1 ColumnParent | (1) | ,100% | ,50% | ,41% | ,50% | ,100% |
| 2 Cassandra | dp, | (2) | | | | ,48% |
| 3 CliClient | dp, | dp, | (3) | | | |
| 4 Column*Reader | dp, | dp, | | (4) | | |
| 5 ThriftValidation | dp, | | | | (5) | |
| 6 CassandraServer | dp, | Implement, | | | dp, | (6) |

FIG. 5

|  | 1 | 2 | 3 | 4 | 5 | 6 | 7 | 8 | 9 | 10 | 11 | 12 |
|---|---|---|---|---|---|---|---|---|---|---|---|---|
| 1 JMXETPEMBean | (1) | ,50% | ,50% | ,50% | ,31% | ,100% | | ,44% | ,50% | ,100% | ,100% | ,50% |
| 2 StageManager | | (2) | dp, | | | | | | dp,50% | | | |
| 3 DatabaseDescriptor | | | (3) | dp, | | | | dp, | dp, | | | |
| 4 Config | | | ,62 | (4) | | | | | | | | |
| 5 DebuggableSTPExecutor | | | | | (5) | dp,100% | ,50% | ,50% | | | | |
| 6 DebuggableTPExecutor | | | | | ,31% | (6) | ,31% | | | | | |
| 7 StorageService | | dp, | dp, | dp, | | | (7) | dp, | dp,Use, | | | |
| 8 ColumnFamilyStore | | dp, | dp, | dp, | | | | (8) | | | | |
| 9 MessagingService | | dp, | dp, | dp, | | | dp, | | (9) | | dp, | |
| 10 NodeProbe | dp, | | | | | | ,44% | | dp, | (10) | | |
| 11 StatusLogger | dp,50% | | dp, | | ,50% | | dp,50% | dp, | | ,50% | (11) | |
| 12 JMXCTPExecutor | ,50% | ,100% | ,100% | ,100% | ,31% | ,100% | ,31% | ,100% | ,50% | ,50% | ,50% | (12) |

FIG. 6

Algorithm 2 ModelSelector $(EffortArray, T)$

1: $model_{Lin} \leftarrow LinearFit(\text{EffortArray}, T)$
2: $R^2_{Lin} \leftarrow model_{Lin}.getR^2()$
3: if $R^2_{Lin} >= R^2_{thresh}$ then
4:    return $model_{Lin}$
5: end if
6: $model_{Log} \leftarrow LogFit(\text{EffortArray}, T)$
7: $R^2_{Log} \leftarrow model_{Log}.getR^2()$
8: $model_{Exp} \leftarrow ExpFit(\text{EffortArray}, T)$
9: $R^2_{Exp} \leftarrow model_{Exp}.getR^2()$
10: if $R^2_{Log} >= R^2_{thresh}$ and $R^2_{Exp} >= R^2_{thresh}$ then
11:    if $R^2_{Log} > R^2_{Exp}$ then
12:       return $model_{Log}$
13:    end if
14:    return $model_{Exp}$
15: end if
16: if $R^2_{Log} >= R^2_{thresh}$ then
17:    return $model_{Log}$
18: end if
19: if $R^2_{Exp} >= R^2_{thresh}$ then
20:    return $model_{Exp}$
21: end if
22: $model_{poly} \leftarrow PolyFit(\text{EffortArray}, T, 10)$
23: return $model_{poly}$

FIG. 7(a)

Algorithm 1 ranking (ArchDebts, EffortMap)

1: RankedDebts ← ∅  ▷ Initial the return value
2: while ArchDebts is not ∅ do  ▷ Loop until all ranked
3:   maxDebt = MaxDebt(EffortsMap, ArchDebts)
4:   RankedDebts.addtoTail(maxDebt)
5:   ArchDebts.remove(maxDebt)
6:   EffortsMap.removeAllFiles(maxDebt.FileSetSequence)
7: end while
   return RankedDebts

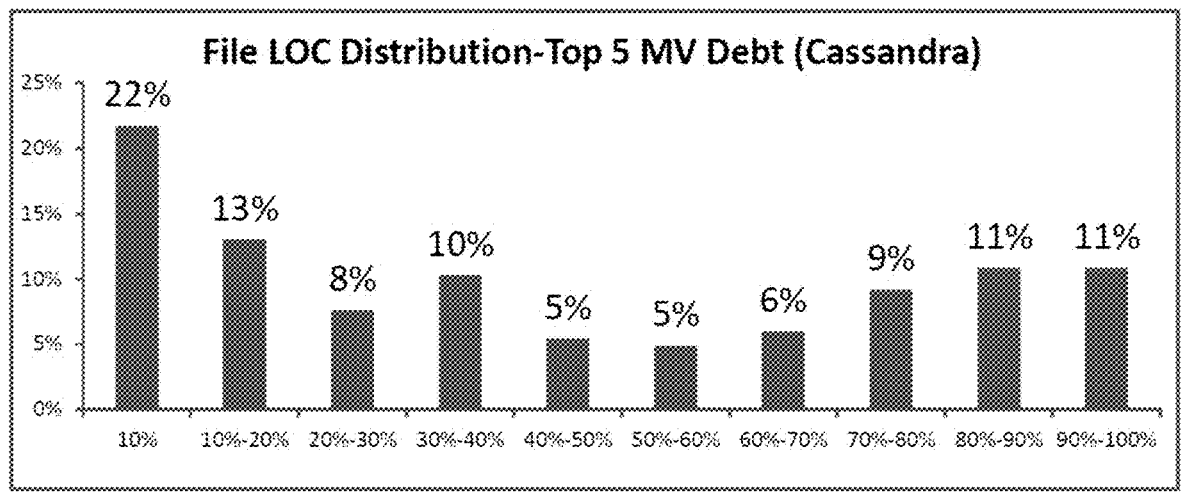
FIG. 9
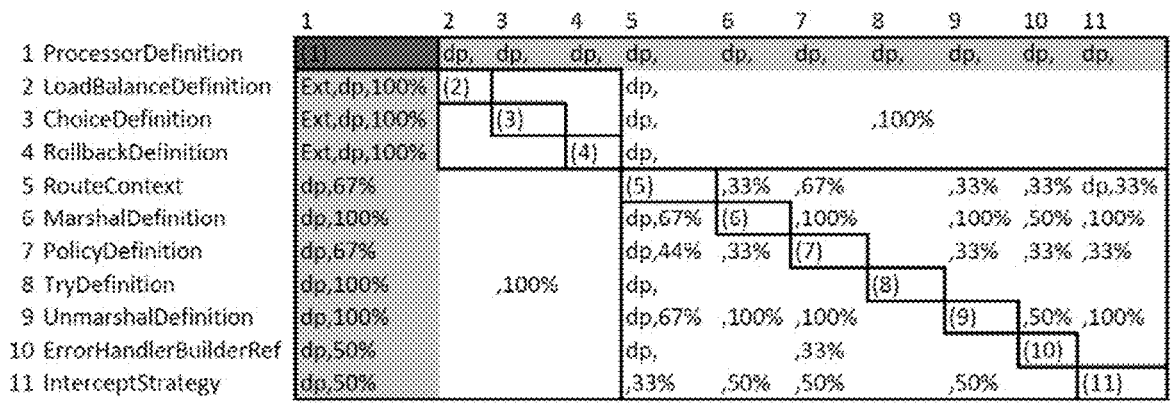
FIG. 10(a) R-2.0.0, Age 1, #File 11, Churn 392

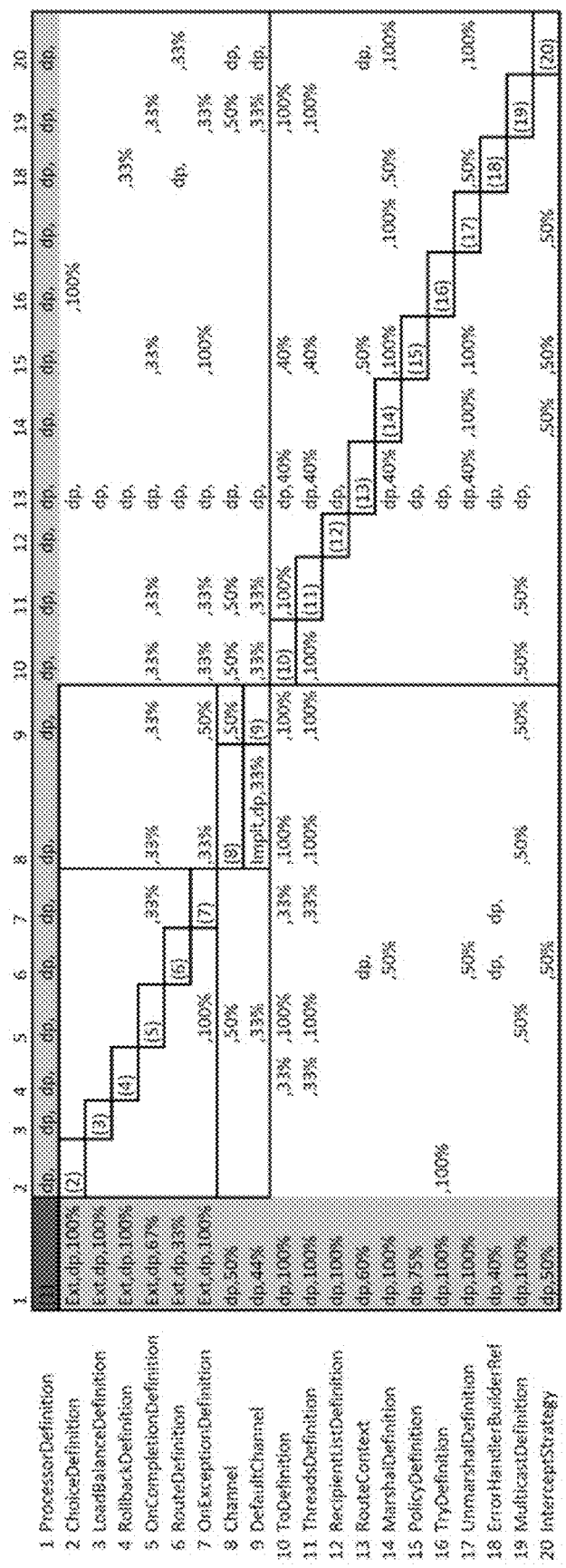
FIG. 10(b) R-2.2.0, Age 2, #File 20, Churn 771

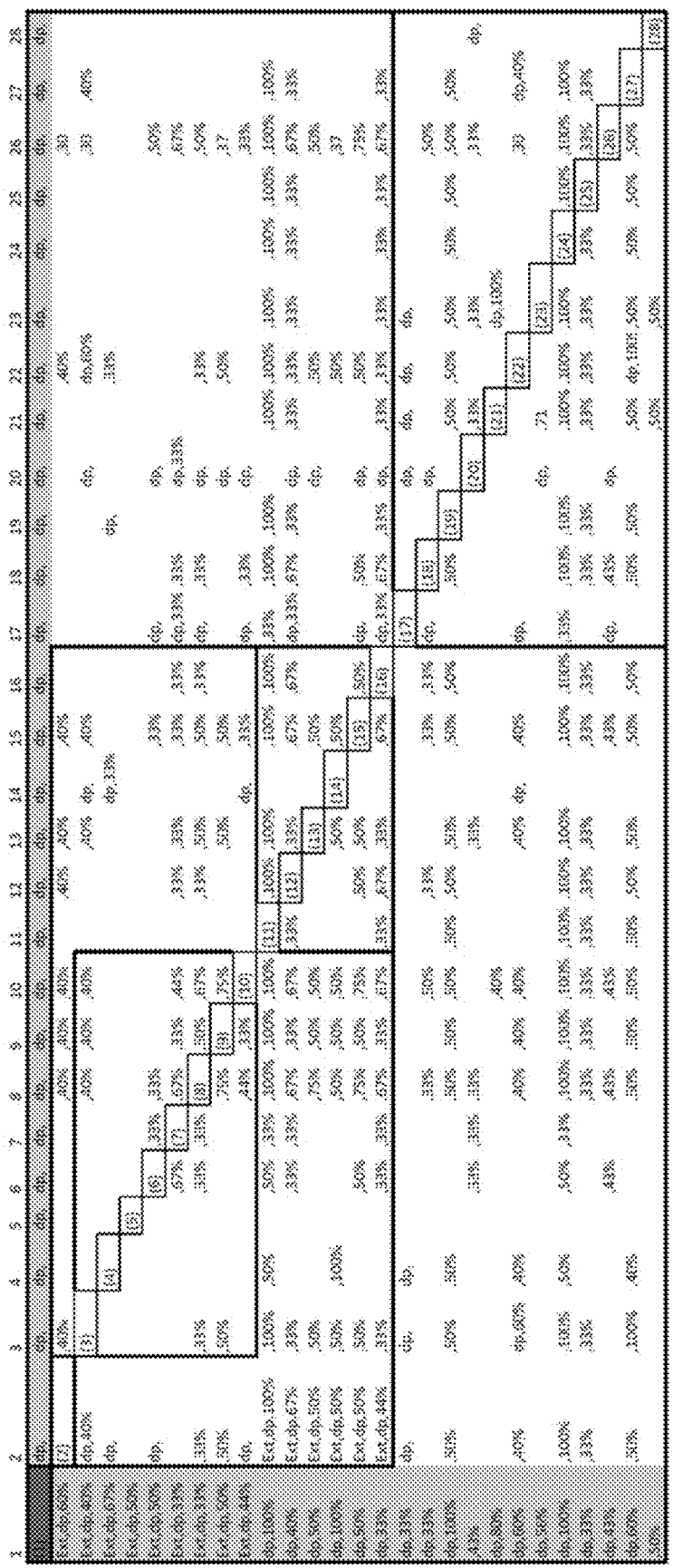
FIG. 10(c) R-2.12.4, Age 11, #File 28, Churn 2134

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 UI | (1) | | | | | | | | | | | | | | | |
| 2 Answer | Ty,Cl | (2) Ty | U | | | | | | | | | | | | | |
| 3 Question | Ty,Cl | U | (3) | | | | | | | | | | | | | |
| 4 Survey | | | Ty,U | (4) Ty,Ct | | | | | | | | | | | | |
| 5 SaveLoadFile | Ex,Ty,Cl | | | | (5) | | | | | | | | | | | |
| 6 TextFileUI | Ex | | | | | (6) (7) | | | | | | | | | | |
| 7 CommandLineUI | | | | | | | (7) | | | | | | | | | |
| 8 Letters | | | | | | | | (8) | | | | | | | | |
| 9 Match | Ty,Cl | Ty,U | Ex,Cl | | | | | Cl (9) | Ty,Cl,Ct (10) | | | | | | | |
| 10 MatchingAnswer | Ty,Cl | Ex,Ty | Ty | | | | | Cl | Ty,Cl,Ct | | | | | | | |
| 11 ChoiceAnswer | Ty,Cl | Ex,Ty | Ty | | | | | | | | (11) Ty,Cl,Ct (12) | | | | | |
| 12 Choice | Ty,Cl | Ty,U | Ex,Cl | | | | | | | | Ty,Cl,Ct | | | | | |
| 13 EssayAnswer | Ty,Cl | Ex,Ty | Ty | | | | | | | | | | (13) Ty,Cl,Ct (14) | | | |
| 14 Written | Ty,Cl | Ty,U | Ex,Cl | | | | | | | | | | Ty,Cl,Ct | | | |
| 15 Test | | Ty,U | Ty,U | | | | | | | | | | | | (15) | |
| 16 AnswerSheet | | | Ex,Cl | | | | | | | | | | | | | Ex,Cl (16) |

FIG. 11(a) Submission 1: DL = 82%; PC = 25%; IL = 75%

|    | 1 | 2 | 3 | 4 | 5 | 6 | 7 | 8 | 9 | 10 | 11 | 12 | 13 | 14 | 15 | 16 | 17 | 18 |
|----|---|---|---|---|---|---|---|---|---|----|----|----|----|----|----|----|----|----|
| 1 UI | (1) |   |   |   |   |   |   |   |   |    |    |    |    |    |    |    |    |    |
| 2 Question | x | (2) |   |   |   |   |   |   |   |    |    |    |    |    |    |    |    |    |
| 3 EssayQuestion | x | x | (3) |   |   |   |   |   |   |    |    |    |    |    |    |    |    |    |
| 4 QuestionFactory | x | x |   | (4) |   |   |   |   |   |    |    |    |    |    |    |    |    |    |
| 5 Survey | x |   |   | x | (5) |   |   |   |   |    |    |    |    |    |    |    |    |    |
| 6 Grader |   | x |   |   | x | (6) | x |   |   |    |    |    |    |    |    |    |    |    |
| 7 Test | x | x |   | x | x |   | (7) |   |   |    |    |    |    |    |    |    |    |    |
| 8 MatchingQuestion | x | x |   |   |   |   |   | (8) | x | x |    |    |    |    |    |    |    |    |
| 9 MatchingQuestionFactory | x |   |   | x |   |   |   |   | (9) | x |    |    |    |    |    |    |    |    |
| 10 RankingQuestion | x | x |   |   |   |   |   |   |   | (10) | x |    |    |    |    |    |    |    |
| 11 RankingQuestionFactory | x |   |   | x |   |   |   |   |   |    | (11) |    |    |    |    |    |    |    |
| 12 ShortAnswerQuestionFactory | x |   |   | x |   |   |   |   |   |    |    | (12) | x |    |    |    |    |    |
| 13 EssayQuestionFactory | x | x | x | x |   |   |   |   |   |    |    |    | (13) |    |    |    |    |    |
| 14 ShortAnswerQuestion | x | x |   |   |   |   |   |   |   |    |    |    |    | (14) |    |    |    |    |
| 15 MultipleChoiceQuestion | x | x |   |   |   |   |   |   |   |    |    |    |    |    | (15) | x | x |    |
| 16 MultipleChoiceQuestionFactory | x |   |   | x |   |   |   |   |   |    |    |    |    |    |    | (16) |    |    |
| 17 TrueFalseQuestion | x | x |   |   |   |   |   |   |   |    |    |    |    |    | x |    | (17) |    |
| 18 TrueFalseQuestionFactory | x |   |   | x |   |   |   |   |   |    |    |    |    |    |    |    | x | (18) |

FIG. 11(b) Submission 2: DL = 78%; PC = 37%; IL = 78%

FIG. 11(c) Submission 3: DL = 18%; PC = 51%; IL = 18%

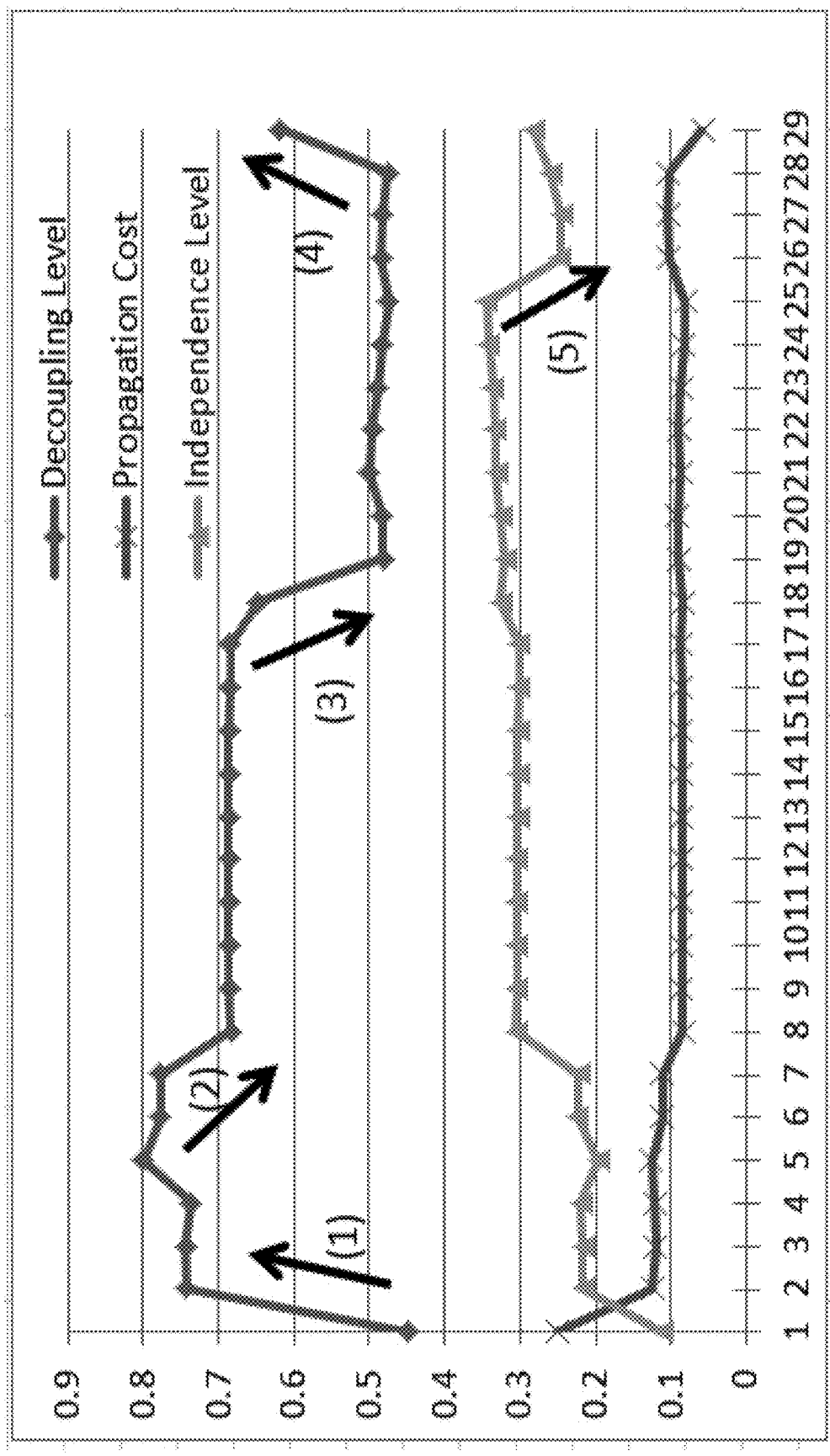
FIG. 13: The DL Variation for Comm_1

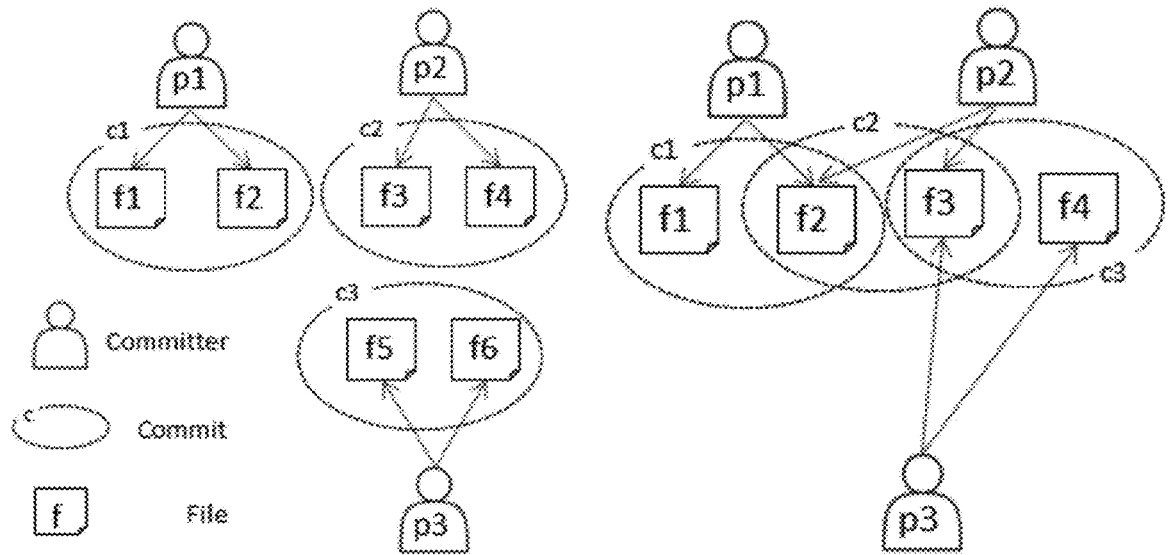
(a) Case 1: $COR = 1$; $CFOR = 1$; $PCO = 0$
(b) Case 2: $COR = 1.5$; $CFOR = 1.5$; $PCO = 0.44$
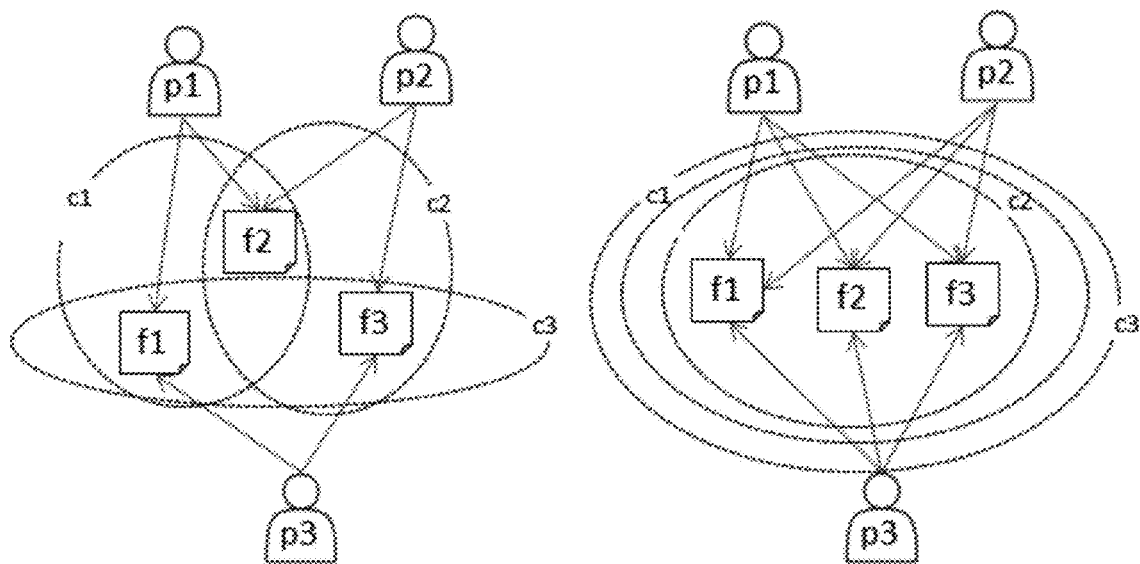
(c) Case 3: $COR = 1.5$; $CFOR = 1.5$; $PCO = 0.67$
(d) Case 4: $COR = 3$; $CFOR = 3$; $PCO = 2$
FIG. 14(a)-(d)

| Index | release | DL(%) | PC(%) | IL(%) | #Files |
|---|---|---|---|---|---|
| 1 | 0.10 | 45 | 25 | 11 | 1063 |
| 2 | 1.01 | 74 | 12 | 22 | 1455 |
| 3 | 1.02 | 74 | 12 | 22 | 1465 |
| 4 | 1.03 | 74 | 12 | 22 | 1474 |
| 5 | 1.04 | 80 | 13 | 20 | 1411 |
| 6 | 1.05 | 78 | 11 | 22 | 1519 |
| 7 | 1.06 | 78 | 11 | 22 | 1523 |
| 8 | 2.01 | 68 | 8 | 31 | 1086 |
| 9 | 2.02 | 69 | 9 | 31 | 1097 |
| 10 | 2.03 | 69 | 9 | 31 | 1097 |
| 11 | 2.04 | 69 | 9 | 30 | 1096 |
| 12 | 2.05 | 69 | 9 | 30 | 1096 |
| 13 | 2.06 | 69 | 9 | 30 | 1099 |
| 14 | 2.07 | 69 | 9 | 30 | 1099 |
| 15 | 2.08 | 69 | 9 | 30 | 1099 |
| 16 | 2.09 | 69 | 9 | 30 | 1107 |
| 17 | 2.10 | 69 | 9 | 30 | 1109 |
| 18 | 2.11 | 65 | 8 | 33 | 1140 |
| 19 | 2.12 | 48 | 9 | 32 | 1197 |
| 20 | 2.13 | 48 | 9 | 33 | 1216 |
| 21 | 2.14 | 50 | 9 | 33 | 1196 |
| 22 | 2.15 | 50 | 9 | 33 | 1209 |
| 23 | 2.16 | 49 | 9 | 34 | 1233 |
| 24 | 2.17 | 48 | 8 | 34 | 1248 |
| 25 | 2.18 | 47 | 8 | 34 | 1273 |
| 26 | 2.19 | 48 | 10 | 25 | 1575 |
| 27 | 2.20 | 48 | 10 | 25 | 1589 |
| 28 | 2.21 | 48 | 10 | 26 | 1556 |
| 29 | 3.01 | 62 | 6 | 28 | 1852 |

FIG. 15, Table 6

IDENTIFYING AND QUANTIFYING ARCHITECTURAL DEBT AND DECOUPLING LEVEL: A METRIC FOR ARCHITECTURAL MAINTENANCE COMPLEXITY

STATEMENT REGARDING GOVERNMENT SUPPORT

This invention was made with government support under Grant No. 1065189 awarded by the National Science Foundation. The government has certain rights in the invention.

BACKGROUND

Technical Debt

Technical Debt (TD) is a term to describe the long term consequences of short-cuts taken in coding activities for immediate goals. Developers introduce debts when they opt for "quick and dirty" solutions, but postpone tasks for longer-term improvements. Prior work has shown that some error-prone files may be architecturally connected through flawed relations. These flawed relations may propagate defects among large numbers of files, and incur increasing maintenance costs over time. A flawed architecture relation is similar to a debt in that it accumulates penalty, in terms of maintenance costs, the same way a debt accumulates interest, and such flaws are architectural debts.

The concept of TD is different than real debt. A real debt always starts from a principal—how much was borrowed, and it grows with a certain interest rate. Existing work approximates TD using code smells, but how to quantify their principal and interest rate remains a challenge. Quantifying architectural debt's parameters may help in understanding and managing it.

Technical debt describes consequences of near-sighted decisions in software development, such as incomplete documentation, low test coverage, uncorrected defects etc. In the past decade, technical debt has drawn increasing attention in the software engineering community, which built an ontology of technical debt by organizing and defining different types of debts. Some proposed types of debts, such as design debt and requirement debt, by reviewing the comments left by developers.

Many questions in the area of technical debt remain open: how to formally define different types of technical debt? How to measure the consequences of debt? How does debt accumulate maintenance costs?

Decoupling (1) Code Quality Measures. Numerous metrics have been proposed to measure software quality since 1970s. The most famous example is McCabe Cyclomatic complexity. After object-oriented programming became popular, various metrics were proposed to measure OO programs, such as the well-known CK metrics, LK Metrics, and MOOD Metrics. These metrics have been used to predict quality issues, or to locate error-prone files. Some researchers have investigated the relation between dependency structure and software defects. After quantifying code issues, such as code smells, and combining with other well-known metrics, commercial tools, such as SonarQube8 and Infusion9, can provide a single number, SonarQube's technical debt and Infusion's Quality Deficit Index (QDI), for management to monitor software quality.

Even though these complexity metrics have demonstrated to be useful for defect prediction, the most predictive metrics may be different in different projects. One challenge may be that code quality may not equal architecture/design quality. Thus far, no metric has successfully been used to compare maintainability among large number of different projects, or demonstrates similar behavior as a real metric, such as a centimeter.

(2) History Measures and Quality. Similar to structural metrics above, most measures extracted from history were proposed for bug location and error prediction. There have been numerous studies of the relationship between evolutionary coupling and error-proneness. For example, some researchers report a strong correlation between density of change coupling and failure proneness, while others demonstrate file size and file change information may be useful to predict defects.

Using DL, a designer may judge if the maintainability is below average at early stages of software development.

(3) Architecture Metrics. Option Valuation, Propagation Cost (PC), and the Independence Level (IL) proposed by the inventors are attempts to apply option theory in software design and three metrics that have objectives similar to DL: to enable cross-project comparison in terms of how well a system can support parallel development and revision. Although by far less well-known than the metrics mentioned above, PC has been used by industry, especially in terms of measuring coupling variation within a project. IL, as a simplified, option-based metric, also has been accepted by one of our industrial collaborators to compare hundreds of projects they are developing, using the IL values collected from open source projects as benchmarks. One formula is the Option valuation, which may be used to quantitatively compare two variations of Key Word in Context (KWIC).

Option valuation requires the estimation of the technical potential of each module, PC suffers from instability and is extremely sensitive to the number of files, and IL is oversimplified with several drawbacks such as not considering the size of each module.

SUMMARY OF THE EMBODIMENTS

The system/method herein considers groups of architecturally connected files that incur and accumulate high maintenance costs as architectural debts. To quantify such debts, architectural debt, which is a term used herein, may be identified, quantified, measured, and modeled. A history coupling probability matrix for this purpose may search for architecture debts through the lens of 4 patterns of prototypical architectural flaws shown to correlate with reduced software quality.

Further, a new architecture maintainability metric—Decoupling Level (DL)—measures how well the software can be decoupled into small and independently replaceable modules. The DL metric opens the possibility of quantitatively comparing maintainability between different projects, as well as monitoring architecture decay throughout software evolution. Decoupling Level may be the only software maintainability metric that bears similarity with other metrics used in everyday life, such as the centimeter, in that it allows managers to monitor, evaluate, and compare software projects and their evolution.

BRIEF DESCRIPTION OF THE DRAWINGS

FIG. 4 shows a table for an anchor submissive.
FIG. 5 shows a table for an anchor dominant.

FIG. 6 shows a table for modularity violation.
FIGS. 7(*a*) and 7(*b*) show pseudocode.
FIG. 9 shows top 5 debts file size distribution.
FIGS. 10(*a*)-10(*c*) show different churn example tables.
FIGS. 11(*a*)-(*c*) shows design rule hierarchy examples.
FIG. 13 is a graph showing DL variation.
FIGS. 14(*a*)-(*d*) show layers with different modular structures.
FIG. 15 shows Table 6, which shows 29 snapshots of Comm 1.

DETAILED DESCRIPTION OF THE EMBODIMENTS

Figure 1:
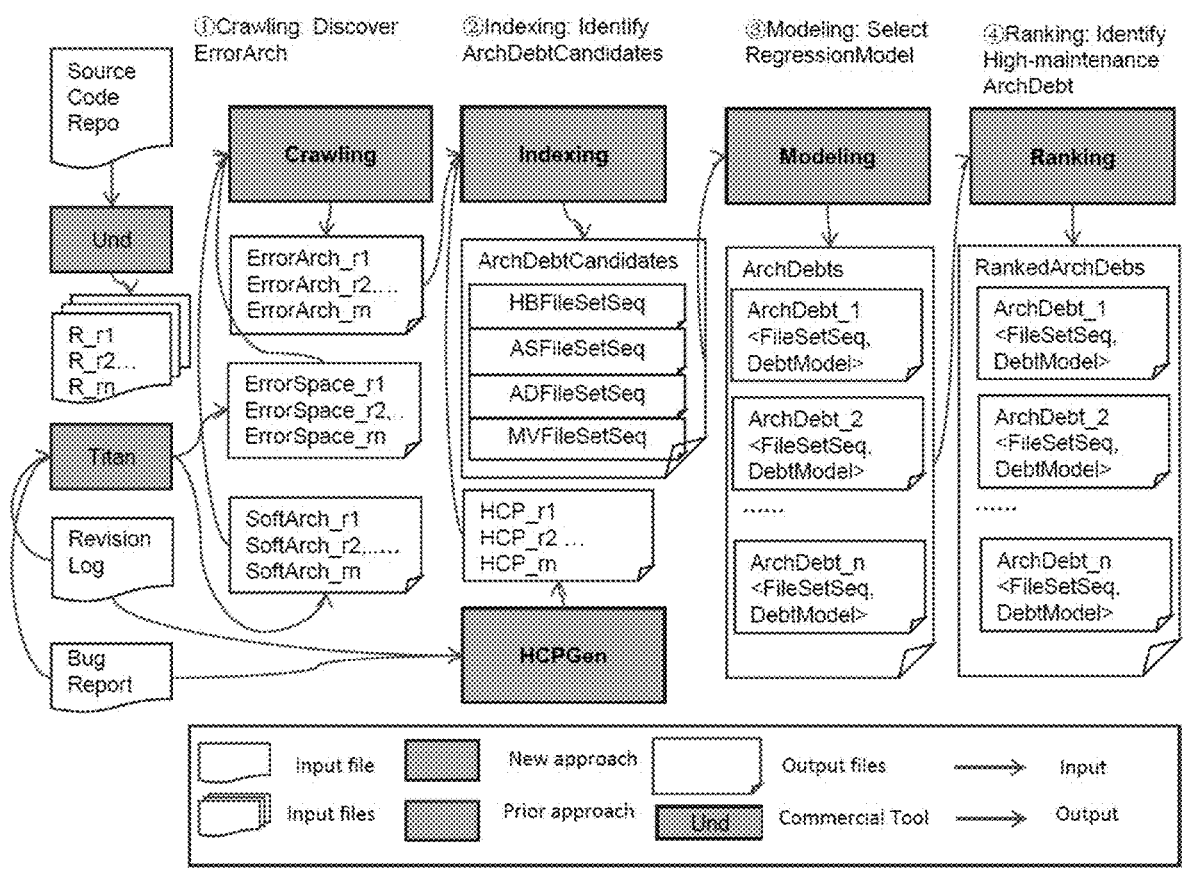
FIG. 1 shows an approach framework discussed herein.

1. Architectural Debt
1.1 Introduction

The concept of architectural debt (ArchDebt) may be considered as a tuple comprising: I) a group of architecturally connected files, and 2) the growth model of their maintenance costs. Based on this definition, an approach to automatically locate architecture debts may be considered, that is: the file groups in a debt, their locations, and the files involved in each. The steps may be to locate a debt and model the growth of the debt penalty using regression models.

The technology for locating ArchDebt may have two parts. First create a novel history coupling probability (HCP) matrix to manifest the probability of changing one file when another file is changed, and may use data extracted from the revision history of a project. Second, search and index file groups through the lens of 4 patterns of prototypical architectural flaws that have been shown to correlate with reduced software quality, namely hub, anchor-submissive, anchor-dominant, and modularity violation.

Given a located ArchDebt, the maintenance costs (approximated by bug-fixing churn) spent on the files in debt can be quantified. From the costs incurred in each release, the growth trend of costs for each debt can be modeled using one of four regression models: linear, logarithmic, exponential and polynomial. These models describe coherent scenarios of stable, reducing, increasing, and fluctuating maintenance interest rates respectively. Finally, identified architectural debts can be ranked according to the maintenance costs they have accumulated.

The inventors evaluated this approach using seven Apache open source projects and identified from 74 to 204 instances of ArchDebts. The results show that a significant portion (from 51% to 85%) of the maintenance effort is consumed by paying interest on these debts, and that non-trivial portions (20% to 61%) of the maintenance effort is consumed by only five ArchDebts, a small portion of all error-prone files.

The evaluation also revealed that about half of the identified debts fit linear regression models, indicating a steady penalty increase. About ⅓, ⅒, and less than ⅒ of all debts fit polynomial, logarithmic, and exponential model respectively, indicating the interest rates of these debts can vary. Finally, the inventors qualitatively analyzed design problems behind debts and observed how these problems evolve into a debt over time.

As a first step towards quantifying architecture debt, this approach may not only enable an analyst to precisely locate the debts, but also rank and prioritize them, so that an informed decision can be made on if, where, and how to refactor. The ArchDebt detection and modeling approaches may work retrospectively when the penalty has already accumulated, thus this approach may be used to monitor the formation of a debt and thus prevent it from growing early in the software development process.

What follows is a summary of certain concepts involved in the software development process and architectural debt model creation.

(1) Design Rule Space. An architectural model—Design Rule Space(DRSpace)—may define software architecture as a set of overlapping DRSpaces, each reflecting an aspect of the architecture. Each DRSpace may be a subset of a system's source files and some kind of relationships (dependencies) among these files. Each DRSpace may have one or more "leading file(s)," which all other files in the DRSpace depend on, directly or indirectly. The leading files are usually the files with architectural importance, such as interfaces or abstract classes, called Design Rules herein. The relation within a DRSpace can be structural, such as "Implement," "Extend," "Call," as well as history coupling between source files indicating the number of times two files changed together as recorded in the revision history.

There are numerous DRSpaces in a software system, e.g., each dependency type forms a DRSpace: files connected by "Extend" and "Inherit" relationships form an inheritance DRSpace, and files that couple in the project's revision history form an evolution DRSpace. An architecture root detection algorithm may compute the intersection between DRSpaces and the project's "error space," the set of error-prone files in a system. Some error-prone files may be concentrated in just a few DRSpaces, suggesting that these error-prone files are not islands—they are architecturally connected. Furthermore, these DRSpaces may contain architectural issues (flaws) that are the root causes of error-proneness.

(2) Design Structure Matrix (DSM). A DSM may represent a DRSpace. Each element in the DSM represents a file, and each cell represents the relationships between the file on the row and the file on the column. For example, FIG. 5 is a DRSpace with leading file ColumnParent. Each cell in the matrix shows the structural dependencies—"implement," or "dp"—between the file on the row and the file on the column, followed by the conditional probability of change propagation. In the DRSpace, the number of times two files changed together in the project's revision history may represent their history dependency.

Herein, this absolute value of the number of occurrences may be replaced with a probability. For example, cell[6,2] contains "Implement," meaning that the file on row 6—CassandraServer—implements the interface on row 2—Cassandra; cell[2,6] contains "48%," meaning that when Cassandra changes, CassandraServer has a 48% probability of changing with it. The inner rectangles on the diagonal represent modules. For example, the rectangle containing cell[3,3] and cell[4,4] may be a module formed by CliCLinet and Column*Reader.

(3) Architecture Issues. Hotspot patterns may be an algorithm for detecting recurring architectural issues in software systems, which may be called hotspot patterns, including: 1) unstable interface, where a highly influential file changes frequently with its dependents in the revision history; 2) modularity violation, where structurally decoupled files frequently change together as recorded in the project's revision history; 3) unhealthy inheritance, where a super-class depends on its sub-classes or where a client class depends on both a super-class and its sub-classes; 4) cyclic dependency, where a set of files structurally forms a cycle. From 9 open source projects, the inventors observed a strong positive correlation between the number of flaws a file has and: 1) the number of bugs reported and fixed in it, 2) the number of changes made to it, and 3) the amount of effort spent on it (in terms of committed lines of code to fix bugs and to make changes).

1.2 Definition and Identification

This section discusses a possible definition for architectural debt (ArchDebt) and presents an ArchDebt identification approach. Before starting that discussion in detail, a review of some of the parameters for architectural debt follow may help introduce what follows. Those parameters are as follow:

(1) Bug Prediction. Researchers in the bug prediction field have proposed various approaches to locate bugs for the purpose of prioritizing testing and debugging tasks. Many researchers have found that past bug-fixing information can be a good predictor for future bugs. In other words, files that are buggy in the past tend to remain buggy in the future. Researchers also found that code complexity metrics are also good predictors for bug locations. Some have reported that file size has the strongest correlation with bugs, while other showed that the predictive power of metrics varies from project to project.

The objective of bug prediction is to optimize the time and people allocated to testing and debugging tasks by predicting where bugs are located. By contrast, our research aims to discover architecture issues that cause bugs to propagate. The fact that historically buggy files are usually still buggy in the future is good news for bug prediction tools, but is bad news for software architects: it means that hugs are never completely fixed, as evidenced by research from the inventors, due to the existence of architectural debts that may grow more and more error-prone files and thus accumulate more and more maintenance costs.

(2) Code Smell Identification. According to one researcher, M. Fowler, "a code smell is a surface indication that usually corresponds to a deeper problem in the system." There are two kinds of smells: smells within classes, such as code clones and god classes, and smell across classes, such as lazy class, and feature envy. Researchers have proposed solutions to automate the detection of smells and code smells have been used as a heuristic for approximating technical debt and identifying refactoring opportunities. Not all technical debts approximated by code smells may lead to high maintenance costs. The inventors' research has shown that not all code smells are technical debts, and not all files that are in debt have code smells.

(3) Design rule theory. Researchers have proposed design rule theory that explains how modularity adds value to a system in the form of options. One theory suggests that independent Modules are decoupled from a system by the creation of Design Rules (DRs). The independent Modules should depend on DRs. As long as the DRs remain stable, a module can be improved, or even replaced, without affecting other parts of the system.

Design rules may be manifested as interfaces or abstract classes. For example, in an Observer Pattern, the observer interface may decouple the subject and concrete observers into independent modules. As long as the interface is stable, the subject shouldn't be affected by the addition, removal, or changes to concrete observers. In this case, the observer interface is considered to be a design rule, decoupling the subject and concrete observers into two independent modules.

(4) Design Rule Hierarchy (DRH). To detect design rules and independent modules within a software system, the inventors' defined a clustering algorithm: Design Rule Hierarchy (DRH). As a typical hierarchical structure with n layers, files in layer i of a DRH may only depend on files in higher layers, i.e., layer j, where j<i. Files should not depend on other files in lower layers. Hence the files in layer 1 are usually the most influential, typically being interfaces or abstract classes that have many dependents.

The unique feature of a DRH clustering is that files in the same layer are decoupled into modules that are mutually independent from each other. Independence here means that changing or replacing one module will not affect other modules in the same layer. The modules in layer n, that is, the bottom layer of the DRH are truly Independent Modules because each can be improved or replaced without influencing any other parts of the system.

(5) Design Structure Matrix (DSM). Design rules and modules, as well as the structure of the design rule hierarchy, can be visualized using a Design Structure Matrix (DSM). A DSM is a square matrix; its rows and columns are labeled with the same set of files in the same order. The DSM in FIGS. 11($a$) to 11($c$) are examples of Design Rule Hierarchy. The columns and rows are labeled with the names of Java classes reverse-engineered from the source code of a student project submission. A marked cell in row x, column y, cell (x, y) means that the file in row x depends on the file in column y.

The marks in the cell can be further refined to indicate different types of dependencies. For example, in FIG. 11($a$), cell (9, 3) is labeled with "Ex,Cl", which is short for "Extend, Call." This cell indicates that Question is an abstract class, and Match—a question matching class—extends it and calls one of its methods. The cells along the diagonal model represent self-dependency. As used herein, "x" denotes an unspecified dependency type in a DSM.

Figure 11C:
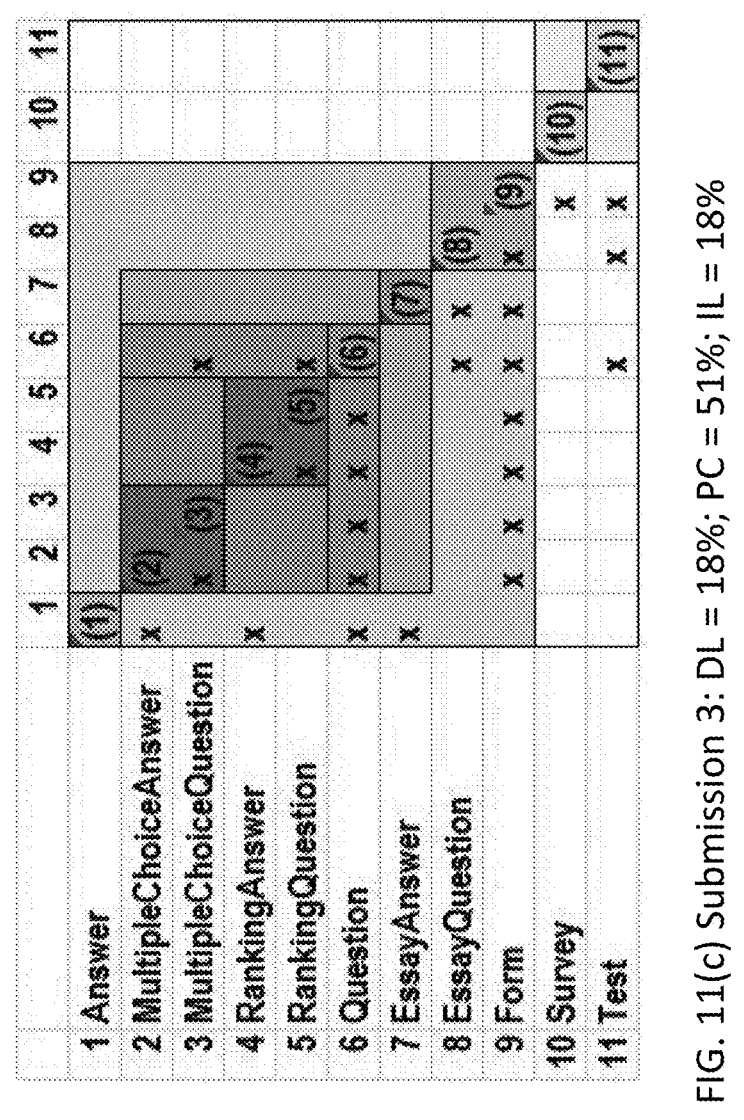

The DSM in FIGS. 11($a$)-($c$) present an automatically generated DRH structure with 4 layers. Layer 1 has one class, UI (File 1), which is the interface that decouples the module with two user interface classes, TextFileUI (File 6) and CommendLineUI (File 7), from their clients, that is, various question and answer classes (File 9 to File 14). Layer 2 has one module with two files, the abstract Question (File 3) and Answer (File 2) classes. The third layer contains one module with one file, Survey (File 4), that aggregates a collection of objects of type Question. These four files in the topmost three layers completely decoupled the rest of the system into 6 independent modules in the last layer, Layer 4 (from File 5 to File 16). Consider the module containing Choice (File 12) and ChoiceAnswer (File 11).

A designer could choose a better data structure for the multiple choice question class without influencing other parts of the system.

(6) Independence Level. Based on design rule theory, the more independent modules in a system, the higher its option value. A metric called Independence Level (IL) may measure the portion of a system that can be decoupled into independent modules within the last layer of its DRH. For example, the IL in the DSM of FIG. 11$a$ is 0.75 because 12 out of the 16 files are in the last layer. The Decoupling Level metric discussed herein improves on the IL metric.

(7) Propagation Cost. A Propagation Cost metric—also calculated based on a DSM—aims to measure how tightly coupled a system is. Given a DSM, one first calculates a transitive closure to add indirect dependencies to the DSM until no more can be added. Given the final DSM with all direct and indirect dependencies, PC is calculated as the number of non-empty cells divided by the total number of cells. For example, the PCs of the three DSMs in FIG.

11(a)-(c) are 25%, 37%, and 51% respectively. The lower the PC, the less coupled of the system.

IL may not consider the modules in the upper layers of a DRH, nor may it consider the size of a module. In collaboration with industrial partners, the inventors observed several cases where the last layer contained very large modules. In these cases, even through the IL appeared to be high, the system was not well modularized. In some other cases, the inventors observed that even though the number of files decoupled in the last layer are not very large, the modules in upper layers have relatively few dependents. In this case, the system may not be experiencing maintenance difficulty, despite its low IL.

PC may not be sensitive to the size of the DSM: the larger the number of files, the smaller the PC. For example, from the 46 open source projects with more than 1000 files, 70% of them have PCs lower than 20%. For the other 62 projects with less than 1000 files, however, about 48% of them have PCs lowers than 20%. More importantly, sometimes an architecture can change drastically without significantly changing its PC.

1.2.1 ArchDebt Definition

We first formally define software architecture of a system, implemented at release r, as a set of overlapping DRSpaces:

$$\text{SoftArchr}=\{\text{DRSpace1},\text{DRSpace2},\ldots,\text{DRSpacen}\} \quad (1)$$

where n is the number of DRSpaces, each revealing a different aspect of the architecture, e.g., each dependency type can form a distinct DRSpace.

We define an Architectural Debt (ArchDebt) as a group of architecturally connected files that incur high maintenance costs over time due to their flawed connections, as follows:

$$\text{ArchDebt}=<\text{FileSetSequence},\text{DebtModel}> \quad (2)$$

The first element, FileSetSequence, is a sequence of file groups, each extracted from a different project release:

$$\text{FileSetSequence}=(\text{FileSet1},\text{FileSet2}\ldots,\text{FileSetm}) \quad (3)$$

where m is the number of releases that ArchDebt impacts, m R, the total number of system releases. FileSetr, r=1 ... m is an architecturally connected file group in release r. The number of files in each FileSet may vary in different releases.

The second element, DebtModel is a formula capturing the growing trend, i.e. interest rate, of the architecture debt, in the form of maintenance costs spent on FileSetSequence.

1.2.2 ArchDebt Identification

Given the formal definition of ArchDebt, the system will first identify FileSetSequence, and then build a DebtModel to capture the "interest rate" based on the costs FileSetSequence has incurred. Since there are numerous DRSpaces in each release, and numerous file groups in each DRSpace that can be debt candidates, the process of searching for FileSetSequence is discussed as an analogy to searching for a specific web page on the Internet, comprising the following steps as shown in FIG. 1:

1) Crawling: this step collects a subset of DRSpaces from each SoftArchr, r from 1 to R, similar to crawling and collecting web pages.

2) Indexing: this step identifies (indexes) a specific file group, FileSet, from each DRSpace selected in the first step, then locates sequences of related FileSets in different releases as a FileSetSequence.

3) Modeling: measures the maintenance costs incurred by each FileSetr in a sequence, and models the cost variation. An ArchDebt is a FileSetSequence with costs that increase over time.

4) Ranking: ranks the severity of each ArchDebt according to the amount of maintenance costs they have accumulated in the project's evolution history.

1.2.2.1 Crawling: Selecting High-Maintenance DRSpaces

We first define the set of error-prone files in a particular release r as an error space: ErrorSpacer={f1, f2, ..., fn}, where file fi, i=1 ... n, was revised to fix bugs at least once from release 1 to release r. According to this definition: ErrorSpacer is a subset of ErrorSpacer+1. For each release r, we select a set of DRSpaces from SoftArchr, each led by a file in ErrorSpacer, and form a SelectedDRSpace set as the output of Crawling:

$$\text{SelectedDRSpacer}=\text{Crawling}(\text{SoftArchr},\text{ErrorSpacer}) \quad (4)$$

Each DRSpace in SelectedDRSpacer is led by an error-prone file in ErrorSpacer, and contains other files that depend on the leading error-prone file. If there are n files in ErrorSpacer, there are n DRSpaces in SelectedDRSpacer.

1.2.2.2 Indexing: Identify ArchDebt Candidates

A next step may find the FileSetSequences that are debt candidates. Files in such a sequence must have changed together in the revision history: First calculate a history coupling model—HCP matrix—and second, filter file groups using 4 architecture flaw patterns, called indexing patterns.

1.2.2.2.1 HCP Matrix

Each cell in the DSM may display the number of times two files changed together. To manifest how a change to a file influences other files, the new system proposed an extended history model: the history coupling probability (HCP) matrix. Although each column and row in a HCP still represents a file, a cell in the matrix may record the conditional probability of changing the file on the column, if the file on the row has been changed, indicating the odds of change propagation from one file to another.

Figures 2, 3:
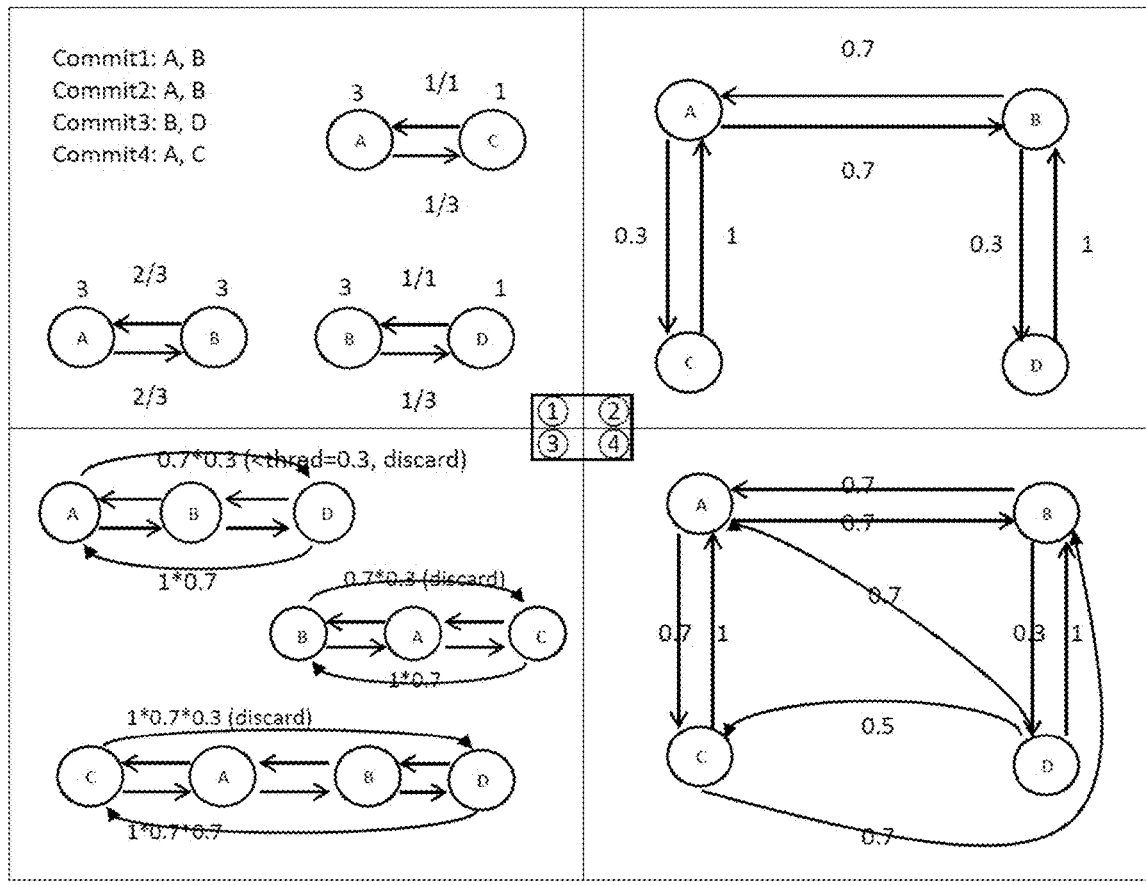
FIG. 2 shows an HPC matrix generation.
FIG. 3 shows a table for a hub.

FIG. 2 shows an example to illustrate the generation of a HCP. Part 1 of FIG. 2 shows 4 files A, B, C, and D, that change in 4 commits: Commit1{A,B} (Commit1 changes A and B), Commit2{A,B}, Commit3{B,D}, and Commit4{A, C}. First, the method may compute the pair-wise change conditional probabilities between any pair of files. For example, the probability of changing file A, under the condition that file C has changed, denoted by Prob{A|C}, is the number of times A and C change in the same commits divided by the total number of changes to C. Similarly, Prob{C|A} is the number of times A and C change in the same commits divided by the total number of changes to A. Hence, Prob{A|C} is 1/1, indicating that A always changes with C, and Prob{C|A} is 1/3, indicating a probability of 1/3 that C changes with A. In this relation, we recognize C as dominant and A as submissive because Prob{A|C}>Prob{C|A}. The method may compute the probabilities between every pair of files and get the graph in part 2 of FIG. 2.

Next, as shown in part 3 of FIG. 2, the method computes the N-Transitive-Closure of the graph in part 2 to identify history dependencies between files that change in distinct but potentially related commits. The conditional probabilities between files without direct history connections are the multiplication of the probabilities on the transitive links. For example, file B and C never change in the same commits, but they change with file A in Commit1 and Commit4. Hence, there are transitive history connections between B and C.

Prob{B|C} is Prob{B|A}*Prob{A|C}=0.7*0.2=0.21, and Prob{C|B} is Prob{C|A}*Prob{A|B}=1*0.7=0.7. We only keep links with probabilities of at least 0.3 to avoid keeping weak connections. In case there are multiple paths between two files, which may suggest different conditional probabilities between two files. We keep the highest probability. Part 4 shows the N-Transitive-Closure which is stored in an adjacency matrix, called a HCP matrix.

For each release r of a project, the method computes an HPC matrix (HPCr), consisting of files in ErrorSpacer, from the bugfixing revision history between release 1 to release r.

1.2.2.2.2 Indexing Patterns

Next the method computes the interaction between SelectedDRSpacesr and HCPr to find FileSetr from each release. In some cases, even though the number of files in a FileSet may vary in different releases, they may be connected to at least one file over all releases. For example, if more child classes are defined to extend a parent class over time, the group of files connected to the parent class grows. This one special file, the Anchor file of the group, may be denoted as file a. In this, FileSetr may be:

$$\text{FileSetr} = \{a, M_r | M_r = \{m_i : i \text{ from 1 to } n\} | \forall mi \in M_r, m_i \text{ architecturally connected with } a \text{ in release } r\} \quad (5)$$

where FileSetr∈FileSetSequence, a is the anchor file, and the files contained in $M_r$ may change with release r. We call $M_r$ the member files of a in release r.

We also define two Boolean expressions to describe the relationships between two files (x and y) in release r: $S_r$ (x→y) and $H_r$ (x→y). $S_r$ (x→y) means y structurally depends on x in release r. $H_r$ (x→y) means x is dominant and y is submissive in their co-changes between release 1 to release r.

In HCPr, HCPr [x, y] is the probability of changing y, given x has changed. If HCP [x, y]>HCPr [y, x], then x is dominant and y is submissive. HCP [x, y]=HCPr [y, x] means x and y are equally dominant. Formally:

In release r, $$S_r(x \to y) \text{ is true if } y \in \text{DRSpacer\_}x, \text{ otherwise it is false}$$
$$H_r(x \to y) \text{ is true if } HCP[x,y] \geq HCP_r[y,x]$$
$$\wedge HCP[x,y] \neq 0, \text{ otherwise it is false} \quad (6)$$

For any pair of a and m in a FileSetr, we identify 4 relationships: $S_r$ (a→m), $S_r$ (m→a), $H_r$ (a→m), and $H_r$ (m→a). Each relationship could be either true or false.

We enumerated all 16 combinations of these 4 relationships. The 4 combinations with Hr (a→m) and Hr (a→m) false are irrelevant to our analysis (as we need history to measure debt). From the remaining 12 possible combinations, we defined 4 indexing patterns—Hub, Anchor Submissive, Anchor Dominant, Modularity Violation. Each pattern corresponds to prototypical architectural issues that proved to correlate with reduced software quality.

Given any anchor file a E ErrorSpacer, we could calculate its FileSetr a using SelectedDRSpacer and HCPr through the lens of the 4 indexing patterns:

(1) Hub—the anchor file and each member have structural dependencies in both directions and history dominance in at least one direction. The anchor is an architectural hub for its members. This pattern corresponds to cyclic dependency, unhealthy inheritance (if the anchor file is a super-class or interface class), and unstable interface (if the anchor file has many dependents). Informally such structures are referred to as "spaghetti code," or "big ball of mud." A FileSetr a with anchor file a in release r that matches a hub pattern is denoted by HBFileSetr a and is calculated as:

$$\text{HBFileSetr } a = \text{IndexHB}(a, \text{ErrorArch}_r, HCPr) = \{a, Mr \forall m \in Mr, Sr(a \to m) \wedge Sr(m \to a) \wedge (Hr(a \to m) \vee Hr(m \to a))\} \quad (7)$$

FIG. 3 shows a Hub FileSet for the PDFBox project, anchored by PDAnnotation. The dark grey cell represents the anchor file (cell[4,4] for PDAnnotation). The cells showing the history and structure relationships between member files and the anchor file are in lighter grey. In this HBFileSet, the anchor file structurally depends on each member file, and each member file also structurally depends on the anchor file. When the anchor file changes, each member file has a 50% probability of changing as well. When a member file changes, the anchor file always changes with it. A HBFileSet is potentially problematic because the anchor file, like a huh, is strongly coupled with every member file both structurally and historically.

(2) Anchor Submissive—each member file structurally depends on the anchor file, but each member historically dominates the anchor. This pattern corresponds to an unstable interface, where the interface is submissive in changes. An Anchor Submissive FileSet with anchor a in release rt is:

$$ASFileSet_{r\_a} = Index_{AS}(a, ErrorArch_r, HCP_r) = \quad (8)$$
$$\{a, M_r | \forall m \in M_r, S_r(a \to m) \wedge \neg S_r(m \to a) \wedge H_r(m \to a)\}$$

FIG. 4 shows an ASFileSet with anchor AbstractType in the Cassandra project. Each member file structurally, directly or indirectly, depends on the anchor file, but when the member files change, the anchor file changes with each of them, with historical probabilities of 33% to 100%. An ASFileSet may be problematic because the history dominance is in the opposite direction to the structural influences: the anchor file should influence the member files, not the other way around.

(3) Anchor Dominant—each member file may structurally depend on the anchor file and the anchor file historically may dominate each member file. This pattern may correspond to the other type of unstable interface, where the interface is dominant in changes. An Anchor Dominant FileSet with anchor a in release rt may be calculated as:

$$ADFileSet_{r\_a} = Index_{AD}(a, ErrorArch_r, HCP_r) = \quad (9)$$
$$\{a, M_r | \forall m \in M_r, S_r(a \to m) \wedge \neg S_r(m \to a) \wedge H_r(a \to m)\}$$

FIG. 5 shows an ADFileSet calculated using anchor ColumnParent in Cassandra. Each member file (from row 2 to row 6) structurally depends on (cell[2 to 6:1]) the anchor file (row 1), and when the anchor file changes, the member files change as well with probabilities from 41% to 100% (cell[1:2 to 6]). An ADFileSet may present potential problems where the anchor file is unstable and propagates changes to member files that structurally depend on it.

(4) Modularity Violation—there are no structure dependencies between the anchor and any member, however, they historically couple with each other. In a modularity violation, the anchor file and the member files share some common assumptions ("shared secrets"), but these are not represented in any structural connection. A MV FileSet with anchor a in release r can be calculated as:

$$MVFileSet_{r\_a} = Index_{MV}(a, ErrorArch_r, HCP_r) = \qquad (10)$$
$$\{a, M_r \mid \forall m \in M_r, \ \to S_r(a \to m) \land \to S_r(m \to a) \land H_r(m \to a) \lor$$
$$H_r(a \to m))\}$$

FIG. 6 is a MV FileSet with anchor JMXCTPExecutor (row 12) in Cassandra. The anchor file, on the bottom of the matrix, is structurally isolated from the member files. However, when the anchor file changes, there are historically 31% to 100% probabilities that the member files change as well, and when the member file JMXETPEMBean (on row 1) changes, the anchor file has a 50% chance to change with it. This pattern identifies potential problems where the anchor file and the member files share common assumptions, without explicit structural connections, and these assumptions are manifested by historical co-change relationships.

1.2.2.2.3 Identify ArchDebtCandidates by Anchor File

For each release r, we use each a in ErrorSpacer as the anchor file to calculate a FileSet for each of the 4 patterns: $HBFileSet_{r,a}$, $ASFileSet_{r,a}$, $ADFileSet_{r,a}$, and $MVFileSe_{r,a}$.

The FileSetSequence in the Hub pattern with anchor file a is denoted by HBFileSetScquencea. Similarly, for anchor a, we can identify AS-, AD-, and MVFileSetSequencea. Using any error-prone file as the anchor, we can identify 4 FileSetSequence, each of which is an ArchDebtCandidate.

As a result, for each a∈ErrorSpacer and for each release r, we can exhaustively detect $4 * |\cup_{r=1}^{n} ErrorSpace_r|$ candidates, which equals $4 * |ErrorSpace_n|$ because $ErrorSpace_n$ is a super set of all ErrorSpace in earlier releases.

1.2.2.3 Modeling: Build Regression Model

Once the method identifies the FileSetSequences candidates of Archdebt, the method may further: (1) measure maintenance costs incurred by each FileSet within a FileSetSequence, and (2) formulate a DebtModel to capture cost variation.

1.2.2.3.1 Measure ArchDebtCandidates

From each FileSetSequence, the method may first exclude each FileSetr that only contains 1 file (the anchor file) since it may not involve architecture problems. After that, the method may define the age of a FileSetSequence as the number of FileSets in it after unqualified FileSets are filtered out.

Then, for each FileSetr, the method may measure the maintenance effort, denoted by Effort FileSetr, consumed by the end of release r. For any file f∈FileSetr, the method may approximate its maintenance costs as the amount of bug-fixing churn on it by the end of release r. The maintenance cost for file f may be denoted by release r as ErrorChurnr f. Effort FileSetr is the sum of maintenance costs spent on each file in the set:

$$\text{Effort\_FileSetr} = \Sigma_{\forall f \in FileSetr} ErrorChurn_{r,f} \qquad (11)$$

To qualify as real debt, first, a FileSetSequence should have long-lasting impacts. This can be evaluated using the age of FileSetSequence. Second, FileSetSequence should consume increasing amount of maintenance effort. Suppose a software system has n releases. Let FileSetf and FileSetl be the first and last element in FileSetSequence. A FileSetSequence is identified as a real debt if it satisfies the following conditions:

$$\begin{cases} age >= n/c; \\ \text{Effort\_FileSet}_l > \text{Effort\_FileSet}_f. \end{cases} \qquad (11a)$$

where c is a tunable parameter. Herein, we use c=2, meaning that FileSetSequence influences at least half of the releases. Otherwise, the candidate is not a meaningful debt, at least not yet. The second condition may require that the maintenance costs on FileSetSequence increase over time (when an anchor file architecturally connects to smaller numbers of member files over time, due to reasons such as refactoring, a candidate may exhibit reducing maintenance costs over time, and thus cannot be a debt).

1.2.2.3.2 Formulate DebtModel

Figure 7:
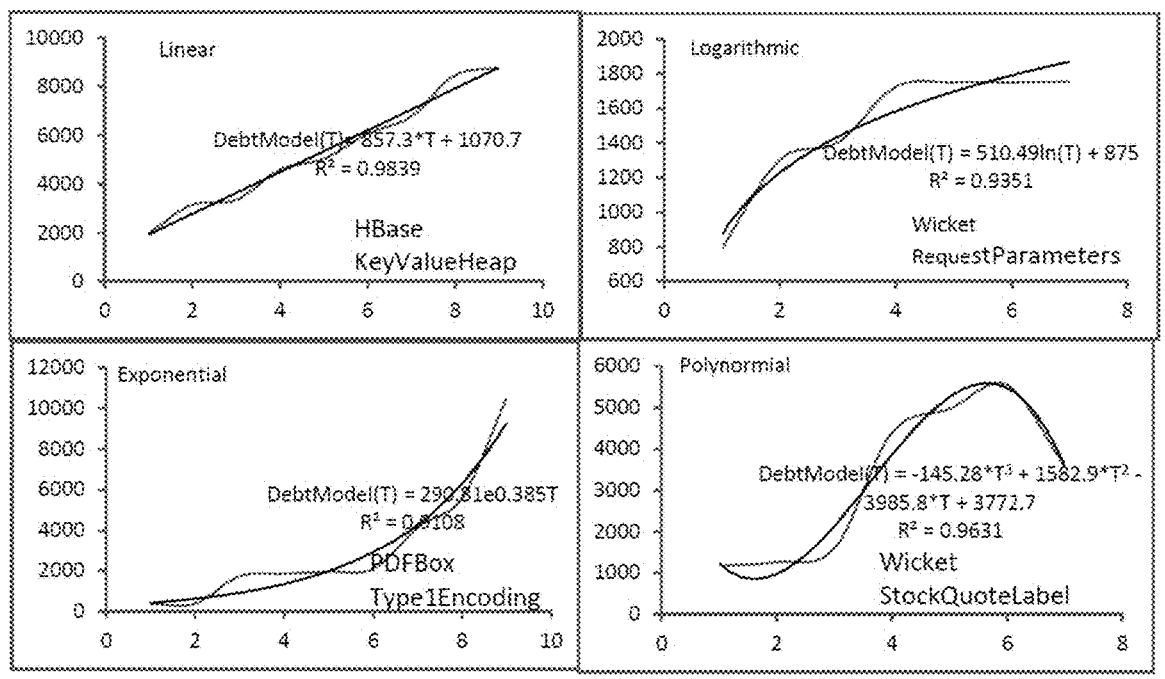
FIG. 7 shows 4 types of regression models.

For each FileSetSequence identified as a real debt, the method may select a suitable regression model as its DebtModel to describe the growing trend (the interest rate) of maintenance costs over time. The method may use four types of regression models: linear, logarithmic, exponential, and polynomial (up to degree 10). FIG. 7 shows typical examples of these 4 models. Each model represents a coherent scenario. In a linear model (part 1 of FIG. 7), the penalties of a debt increase at a stable rate in each version. In a logarithmic model (part 2), the penalties of a debt increase more slowly over time (for example, when developers refactor a group of files, it become easier to make the next change to them, so the interest rate on the debt drops over time). In an exponential model (part 3), the penalties of a debt increase at ever-faster rates over time (for example, the structure of a tangled group of files gets exponentially worse, often in the early stages of a project, before anyone worries about modularity). In a polynomial model (part 4), the penalties of a debt increase with many fluctuations over the set of releases.

The method may calculate the maintenance costs—Effort FileSetr for each FileSetr in a FileSetSequence using equation 11. The Effort FileSetr of all FileSetr in a FileSetSequence form an array that we call Effort Array. Effort Array[i]=Effort FileSetr, where FileSetr is the ith element of FileSetSequence. We define an integer array T [i]=r, where r is the release number of the ith element in FileSetSequence. Each release r is numbered by its order in the release history. In the DebtModel of a FileSetSequence, Effort Array is the independent value and T is the dependent value. "ModelSelector" selects a regression model for the relationship between T and Effort Array. The formula and $R^2$ of the regression model are returned as DebtModel:

$$DebtModel = ModelSelector(EffortArray, T) \qquad (12)$$

We define a global parameter $R^2_{thresh}$ (the R2 threshold) for ModelSelector. $R^2_{thresh}$ ranges from 0 to 1; the higher the value, the stricter Effort_Array and T fit the selected model. The ModelSelector algorithm first tries to fit the Effort_Array and T into a linear regression model. If the $R^2_{Lin}$ of the linear model reaches the threshold $R^2_{thresh}$, it returns the linear model. If not, it builds both logarithmic model and exponential model, and computes their $R^2$ values. If the $R^2$ values of both models reach $R^2$, it returns the model that gives a higher $R^2$. Otherwise, it returns the model that reaches the threshold. If the debt fits neither of them with $R^2 >= R^2_{thresh}$, it tries polynomial models of degrees up to 10. A polynomial model where $R^2_{poly} >= R^2_{thresh}$ or the degree reaches 10, whichever is satisfied first, is returned. Corresponding pseudocode may be seen in FIG. 7a.

The algorithm "ModelSelector" may select a suitable regression model for the input EffortArray (dependent variable) and T (independent variable). EffortArry is an array storing the maintenance costs of a ArchDebtat different timestamps stores in array T.

There is a global variable R^2_thresh, which controls how well the input data fit into a regression model. The higher the value, the better the fit. Experiments by the inventors used 0.75 and 0.8.

The algorithm works as follows. First, try linear regression model, if input data fit with R^2 greater than the threshold, then return this model(line 1 to 5). Otherwise, try logarithmic and exponential models, if both fit with R^2 greater than the threshold, return the one with higher R^2, otherwise return the one with R^2 greater than the threshold (line 6 to 21). When the data fit into none of linear, logarithmic, or exponential with R^2 greater than the threshold, try polynomial model of degree up to 10. A polynomial model of R^2 greater than the threshold or degree of 10 is returned, whichever is reached first.

In the ModelSelector algorithm, the method may give higher priority to linear, logarithmic, and exponential models over polynomial models. One would not simply pick the best fit (i.e., the model with highest $R^2$).

The reason is that the linear, logarithmic, and exponential models present three general types of penalty interest rate: stable, decreasing, and increasing. The polynomial model, however, catches minor fluctuations of the penalty trend, most likely a result of noise due to extraneous factors. For example, the debt in part 1 of FIG. 7, intuitively a linear model (DebtModel(r)=857*r+1070 with R2 of 0.98), can fit into a polynomial model DebtModel(r)=−2*r6+59*r5−680*r6+3874*r3−11342*r2+16538*r−6466, with a higher R2 (0.99). The polynomial model fits better (higher R2), but the linear model may be preferred. As long as a debt penalty generally (R2>=$R^2_{thresh}$, where $R^2_{thresh}$ is 0.8) fits into a linear, logarithmic or exponential model, one may want to choose the linear model.

For each FileSetSequence, one may identify its DebtModel. This completes the ArchDebt identification.

1.2.2.4 Ranking: Identify High-Maintenance ArchDebt

Not all architectural debts may have the same severity in terms of the maintenance costs they incur. Debts with higher maintenance consequences may deserve more attention. One may rank all the identified architectural debts according to their accumulative maintenance cost as follows.

We define a pair pf=<f, ErrorChurnf>, where f is an error-prone file, $ErrorChurn_f$ is the maintenance costs for f, approximated by bug-fixing churn on f. Let EffortMap be the set of $p_f$, such that ∀f∈ErrorSpacen (n is the latest release), there exists a $p_f$∈EffortMap. EffortMap may be one of the inputs to the ranking algorithm. The other input is the identified ArchDebts.

$$RankedDebts=ranking(ArchDebts, EffortMap) \quad (13)$$

The ranking algorithm may rank the importance of each ArchDebt according to EffortMap in a loop. Each iteration may select maxArchDebt that consumes the largest portion of effort for files in EffortMap from ArchDebts. The effort for duplicate files are excluded, and the iteration terminates when all ArchDebts are ranked.

Figures 7B, 8:
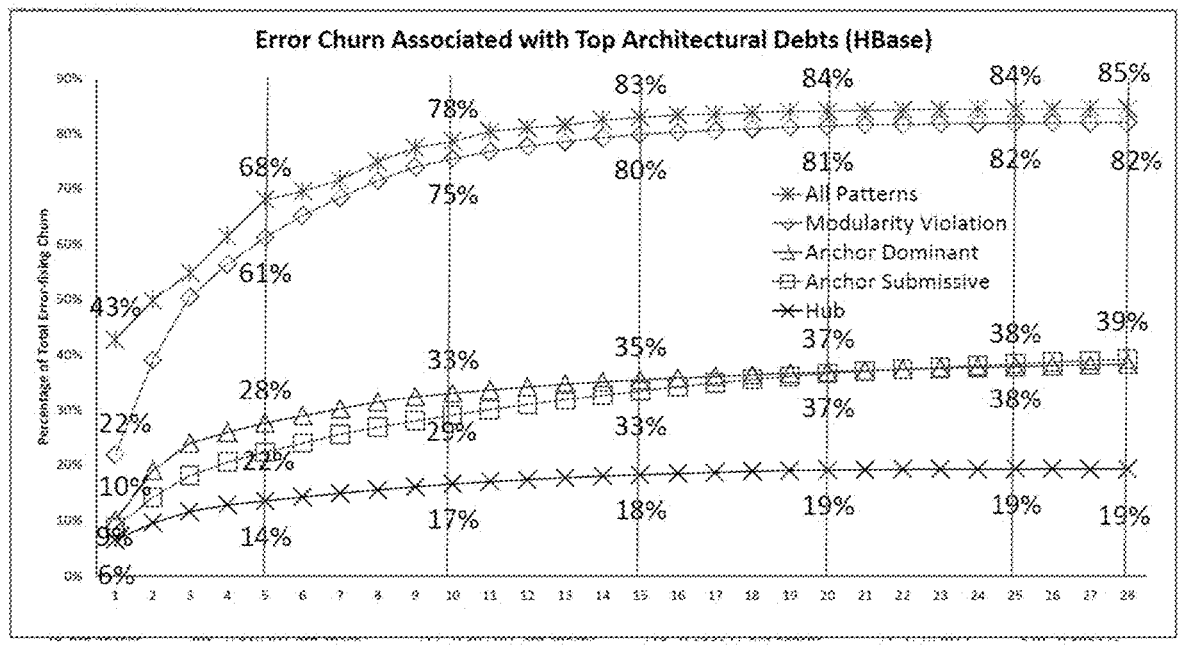
FIG. 8 shows a graph of debt churn consumption.

The FIG. 7b algorithm ranks the severity of a set of ArchDebt (ArchDebts) according to the maintenance effort spent on each file in a ArchDebt. The second input of this algorithm EffortMap is a map from file name to the maintenance effort of this file.

In line 1, RankedDebts is initialized to be an empty queue. In the while loop, the maxDebt from ArchDebts may consume the maximal amount of effort (retrieved and summed from EffortMap) compared to other items in ArchDebts. Then maxDebt is added to the tail of RankedDebts and removed from ArchDebts (line 4 and 5). All the files contained in maxDebt may be removed from EffortsMap (So duplicated files in different items of ArchDebts are only considered once). The loop terminates until all items in ArchDebts are ranked. The returned RankedDebts has the most effort consuming debts on the top and contain least possible duplicated files on the top as well.

The top debts returned consume the largest possible maintenance effort, and deserve more attention and higher priority.

1.3 Evaluation

To evaluate the effectiveness of the approach described above, the inventor's investigated the following research question: Whether the file groups identified in ArchDebts generate and grow significant amount of maintenance costs? That is, are they true and significant debts? In other words, if the identified file groups only consume a small portion of overall maintenance effort, then they do not deserve much attention. Similarly, if the identified file groups cover a large portion of the system itself, it is not surprising if they also consume most maintenance efforts.

1.3.1 Subjects

For investigation, 7 Apache open source projects were chosen as evaluation subjects. Those projects differ in scale, application domain, length of history, and other project characteristics. They are: Camel—a integration framework based on known Enterprise Integration Patterns; Cassandra—a distributed database management system; CXF—a fully featured Web services framework; Hadoop—a framework for reliable, scalable, distributed computing; HBase—the Hadoop database, a distributed, scalable, big data store; PDFBox—a Java library for working with PDF documents; and Wicket—a lightweight component-based web application framework;

A summary of these projects is in Table 1. The first column is the project name. The second column is the history studied for each project, presented as start to end time and the total number of months (in parentheses). The third column "#R." shows the number of releases selected from each project. The selection of releases was made to ensure that the time interval between two consecutive releases is approximately 6 months in each project. The column "#Cmt." is the total number of commits made over the selected history in each project. The column "#Iss." is the number of bug reports for each project, extracted from their bug-tracking systems (JIRA). The last column shows the size range for each project, measured as the number of files in the first and the last selected release.

TABLE 1

| Subject Projects | | | | | |
|---|---|---|---|---|---|
| Subject | Length of history (#Mon) | #R. | #Cmt. | #Iss. | #Files |
| Camel | July 2008 to July 2014 (72) | 12 | 14563 | 2790 | 1838 to 9866 |
| Cassandra | September 2009 to November 2014 (62) | 10 | 14673 | 4731 | 311 to 1337 |

TABLE 1-continued

Subject Projects

| Subject | Length of history (#Mon) | #R. | #Cmt. | #Iss. | #Files |
|---|---|---|---|---|---|
| CXF | December 2007 to May 2014 (77) | 13 | 8937 | 3854 | 2861 to 5509 |
| Hadoop | August 2009 to August 2014 (60) | 9 | 8253 | 5443 | 1307 to 5488 |
| HBase | December 2009 to May 2014 (53) | 9 | 6718 | 6280 | 560 to 2055 |
| PDFBox | August 2009 to September 2014 (62) | 12 | 2005 | 1857 | 447 to 791 |
| Wicket | June 2007 to January 2015 (92) | 15 | 8309 | 3557 | 1879 to 3081 |

1.3.2 Analysis Results

To answer the research question, measure the amount of maintenance effort spent on the ArchDebts was identified by the approach. Error-fixing churn was used as an approximation of work time and budget to fix errors. Error-fixing churn is the number of lines of code modified and committed to fix bugs.

HBase may be considered as an example to illustrate the observations. FIG. 8 shows the percentage of maintenance effort associated with the files in FileSets of all identified ArchDebts in HBase. The x-axis is the number (from 1 to 28) of identified architectural debts. The y-axis is the accumulated percentage of maintenance effort associated with the top x ArchDebts. Each line represents the percentage of each type of debt. This figure depicts, from bottom to top: Hub, Anchor-Submissive, Anchor-Dominant, and Modularity-Violation debts respectively. The line on the top is the total percentage of the 4 types of debts. The values of the top line are not simply the sum of the values of the 4 types because different types of debts may share some files.

The following observations were made in HBase.

(1) The architectural debts may consume a significant percentage (85%) of the total project maintenance effort. This means that a significant portion of the maintenance effort may be spent on paying interest on related groups of files. Identifying these debts early may help the developers save significant effort by paying down these debts via refactoring. As the number of architectural debts increases, the total will never reach 100% because, of course, not all errors are architecturally connected. Occasionally, the developers may introduce errors that can be fixed in isolation.

(2) The top few architectural debts consume a large percentage of maintenance effort. For example, the top 5 Modularity-Violation debts may consume 51% of the total effort, compared to all Modularity-Violation debts consuming 82% of the total effort. Similar observations hold for Anchor-Submissive, Anchor-Dominant, and Hub debts. The lines flatten out as the number of architectural debts increases, indicating that most of the maintenance effort concentrates in the top few debts. This implies that instead of reviewing all the identified debts, the developers only need to focus on the top few.

(3) Modularity Violation debt is most expensive. Huh debts consume the least percentage of effort, while Anchor-Dominant and Anchor-Submissive take similar percentages. The line for Modularity Violation is close to the line for the sum of all types. This implies that Modularity Violation debts involve the files in other debts as well—in other words, Modularity Violation is the most common and expensive debt.

The study made consistent observations from all 7 projects, as summarized in Table 2. Column "All Debts Ch %" shows that, for all 7 projects, from 51% to 85% of the total maintenance effort is consumed by architectural debts. And a large percentage (31% to 50%) of the effort is consumed by the top 5 Modularity Violation debts (shown in sub column "Ch %" under "Modularity Vio."). Modularity-Violation debts impact the largest number of files and consume the greatest effort, Hub debts consume the least, while AnchorSubmissive and Anchor-Dominant rotate their orders.

TABLE 2

Top 5 Debt: #Files vs Churn

| | All Debts | Top 5 Debts | | | | | | | | |
|---|---|---|---|---|---|---|---|---|---|---|
| | | All 4 types | | Modularity Vio. | | Anchor Sub. | | Anchor Dom. | | Hub | |
| Projects | Ch % | Fls | Ch % | Fls | Ch % | Fls | Ch % | Fls | Ch % | Fls | Ch % |
| Camel | 59% | 230(15%) | 35% | 206(13%) | 32% | 20(1%) | 7% | 60(4%) | 16% | 40(2%) | 5% |
| Cassandra | 72% | 273(28%) | 57% | 196(20%) | 50% | 72(7%) | 28% | 33(3%) | 32% | 26(3%) | 16% |
| CXF | 56% | 200(11%) | 27% | 136(8%) | 20% | 70(4%) | 6% | 22(1%) | 10% | 12(1%) | 3% |
| Hadoop | 51% | 145(25%) | 44% | 118(20%) | 42% | 45(8%) | 22% | 10(2%) | 16% | 10(2%) | 6% |
| HBase | 85% | 349(30%) | 67% | 290(25%) | 61% | 87(7%) | 15% | 36(3%) | 27% | 23(2%) | 13% |
| PDFBox | 67% | 133(32%) | 49% | 107(25%) | 45% | 35(8%) | 12% | 30(7%) | 26% | 17(4%) | 10% |
| Wicket | 62% | 295(22%) | 38% | 214(16%) | 31% | 130(10%) | 11% | 35(3%) | 13% | 14(1%) | 7% |

If a debt contains a large number of files, it is not surprising that they take a large percentage of effort.

(4) The top 5 architectural debts may contain only a small number of files, but consume a large amount of the total project effort. The number of files in the top 5 architectural debts may be compared versus the percentage of effort they take. For example, in table 2, column "Modularity Vio" under "Top 5 Debts" shows that, in Camel, there are 206 files (13% of all the error-prone files) in the top 5 ModularityViolation debts, and these 206 files consume 32% of the total project bug-fixing effort. Similarly, in Camel, the top 5 Anchor Submissive, Anchor Dominant, and Hub debts contain only 1%, 4%, and 2% of the error-prone files, but consume 7%, 16%, and 5% of the total effort respectively. From the column "All 4 types" under "Top 5 Debts," for all the projects, the top 5 architectural debts contain from only 11% to 32% of the error-prone files, but consume 27% to 49% of the total effort. The average ratio of percentage of effort to the percentage of files in the top 5 debts is 2.

Finally, the file size (in lines of code) of the debts identified by this approach may be analyzed. The size of a file may correlate with metrics like error rates, fan-out, and churn of a file. Counting the LOC of the files in the top 5 debts, and the sizes of these files are randomly distributed. FIG. 9 is an example, showing the file size distribution of the top 5 Modularity Violation debts identified in Cassandra. The x-axis is the ranges of file size, 10% means the top 10% largest files, 10%-20% means files with top 20% to top 10% largest LOC, and so forth. The y-axis is the percentage of files in the top 5 debts that belong to the size range of x. For example, 22% of the files in top 5 debts are in the range of the top 10% largest files, and 11% of the files are in the range of top 90% to 100% range (that is, the smallest files). The top 5 debts may contain a non-trivial number of large files (22% from the top 10% size range) which is consistent with other studies, that large files tend to be problematic. But FIG. 9 shows that the top 5 debts not only contain the large files, but also contain files in all size ranges.

In summary, the method herein shows that the architectural debts identified herein are debts that account for a large amount (from 51% to 85%) of maintenance effort. Most (31% to 61%) of the maintenance effort concentrates in the top 5 architectural debts, which contain only a small percentage (13% to 25%) of the project's files.

1.4 Discussion

This section discusses which mathematical model may describe the interest rate of a ArchDebt and also illustrate how the approach may be used to understand and monitor the evolution of architectural debts.

1.4.1 The Interest Rate of ArchDebt

For each ArchDebt, a suitable regression model may capture its interest rate, as introduced above, using $R^2 thresh$ of 0.75 and 0.8 respectively. The results are reported in Table 3. The first column is project name. The second column is the number of instances of ArchDebt identified in a project. The third and fourth columns are model distributions for $R^2_{thresh}$ of 0.75 and 0.8 respectively.

TABLE 3

Debt Costs Model Distribution

| Project | #Ds | $R^2_{threshold} = 0.75$ | | | | $R^2_{threshold} = 0.8$ | | | |
|---|---|---|---|---|---|---|---|---|---|
| | | Lin | Log | Exp | Poly | Lin | Log | Exp | Poly |
| Camel | 199 | 52% | 19% | 0% | 30% | 39% | 20% | 2% | 39% |
| Cassandra | 180 | 61% | 7% | 2% | 30% | 53% | 6% | 3% | 39% |
| CXF | 189 | 56% | 12% | 1% | 32% | 45% | 10% | 4% | 41% |
| Hadoop | 74 | 46% | 7% | 7% | 41% | 36% | 8% | 3% | 53% |
| Hbase | 204 | 65% | 7% | 2% | 25% | 62% | 4% | 2% | 31% |
| PDFBox | 85 | 59% | 4% | 5% | 33% | 39% | 1% | 9% | 51% |
| Wicket | 153 | 46% | 22% | 1% | 30% | 38% | 17% | 1% | 44% |

When $R^2_{thresh}=0.75$, in all the projects, about half (46% to 65%) of the debts fit a linear regression model (with $R^2>=0.75$). For other debts where a linear model doesn't fit, a small percentage fits either a logarithmic (4% to 22%) or exponential (0% to 7%) model (with $R^2>=0.75$), and a polynomial model fits 25% to 41% of the identified debts.

When $R^2=0.8$, the models are less noise-tolerant. One can see that linear model is still common (36% to 62%) for all projects. But a small portion of debts, from 6% (HBase, 31% minus 25%) to 18% (PDFBox, 51% minus 33%), can no longer fit into linear, logarithmic, or exponential models, but fits a polynomial model.

In summary, when $R^2_{thresh}$ is 0.75, the linear model is most common—about half of the debts fit into it. This indicates that half of ArchDebts accumulate maintenance interest in a constant rate. Only a small portion of debts accumulate interest in a faster (less than 7% in exponential) or slower (less than 22% in Logarithmic) rate. About ⅓ of the identified debts accumulate costs with a more fluctuate rate captured by polynomial model. More ArchDebts fit into a polynomial model when $R^2_{thresh}$ increases.

1.4.2 Architectural Debt Evolution

It was shown above that the top 5 debts consume a large amount of efforts. The inventors manually inspected the evolution of these debts, and illustrate how architectural flaws evolve into debts over time below.

As an example, consider the top Hub debt with anchor file ProcessorDefinition (referred to as PDef in the following context) in Camel (FIGS. 10a-c). Its age is 11. Consider the listed 3 snapshots of this debt in release 2.0.0 (age 1), release 2.2.0 (age 2), and release 2.12.4 (age 11) to show its evolution. Snapshots between age 3 to 10 are similar to that of age 11. "Ext" and "Impl" stand for "extend" and "implement," "dp" denotes all other types of structure dependencies.

In release 2.0.0, PDef forms a hub with 10 member files, 3 files are its subclasses, the other 7 files are its general dependents, and PDef structurally depends on each of them. Note that in this snapshot, all files, except InterceptStrategy, depend on RouteContext (column 5). The 11 files in this hub structurally form a strongly connected graph. According to the revision history, PDef changes with all member files with probabilities from 50% to 100% (column 1). The general dependents (on row 5 to 11) of PDef are highly coupled with each other. This snapshot is problematic in 3 ways: 1) the parent class PDef depends on each subclass and each dependent class (unhealthy inheritance [10]); 2) the parent class is unstable and often changes with the subclasses and dependent classes (unstable interface [10]). 3) RouteContext forms cyclic dependencies with 9 files (cycles). Without fixing the architectural issues, one may expect this group of files incur more maintenance costs over time.

In release 2.2.0, the impacts of this hub enlarged—PDef has 3 more subclasses and 6 more general dependents, and it depends on each of them as well. Each newly involved file also depends on RouteConetxt (column 13). The revision history shows that PDef changes with its subclasses and dependents with probabilities of 33% to 100%. Also, the subclasses and dependents (row 5 to 11) of PDef are highly coupled with each other—changing any of them is likely to trigger changes to the rest. The architectural issues from the last release are not fixed, and enlarge their impacts by involving more files in release 2.2.0.

In the following releases, the hub involves even more files. Up to release 2.12.4, PDef has 9 subclasses and 18 general dependents—the size of the hub tripled compared to the first snapshot, and, as always, PDef depends on each of them as well. In addition, 6 of the 18 general dependents (row 11 to 16) of PDef also become its grandchildren—not only the width of the inheritance increases, but also the depth. The revision history shows PDef still changes with its decedents and dependents with probabilities from 33% to 100%. Given the tangled structure, the files in this snapshot always coupled with each other as evidenced the revision history—changing any file is likely to trigger change to other files.

The maintenance costs spent on this debt fit into a linear regression mode: DebtModel(rt)=158.75*rt+509.35 with R2=0.89. It means in every release, developers contribute 158.75 more lines of code to fix errors in the hub anchored by PDef. Although this model can only be obtained after the costs and penalty have accumulated, the user can use our approach to detect architecture flaw patterns, as introduced in our recent work [10], watch how the file groups grow using DSMs, monitor the formation of debts, and prevent significant costs by proper refactorings.

2. Decoupling Level: A Metric for Architectural Maintenance Complexity

2.1 Introduction

As already discussed, despite decades of research on software metrics, developers still cannot reliably measure if one design is more maintainable than another, but consider a new architecture maintainability metric: Decoupling Level (DL). Instead of measuring the level of coupling, consider the measurement of how well the software is decoupled into small and independently replaceable modules. This metric is derived from option theory, which suggests that modularity creates value in the form of options: each module creates an opportunity to be replaced with a better version, hence improving the value of the system. Accordingly, small, independently changeable modules are most valuable, and the more such modules there are, the higher the system's value.

The implication of option theory in software design is significant: an independent module in software implies that its bugs can be fixed locally, and changing it will not cause any ripple effects. The smaller the module, the easier it is to improve, and the more such small, independent modules there are, the more developers can contribute to the system independently and in parallel.

The inventors' Design Rule Hierarchy (DRH) clustering algorithm discussed above may manifest independent modules. One may now calculate the Decoupling Level of a system from its DRH.

The inventors measured the DL for 108 open source and 21 industrial projects, each having multiple release and observed that 60% of them have DLs between 46% and 75%. To evaluate if DL can be used as a real metric, they used it both to compare multiple snapshots of the same project, and to compare DLs collected from multiple projects. The results showed that the DL values extracted from consecutive, non-refactoring snapshots are very stable, and non-trivial variation of DL indicates major architectural degradation or improvement. To evaluate if projects with higher DL have higher maintainability, we contribute a suite of maintainability measures that can be extracted from the revision history of a project. These measures indicate the extent to which files were changed separately, and to what extent committers have to change the same set of files. The results show that the larger the DL, the more likely bugs and changes can be localized and separated, and the more likely that developers can make changes independently.

The DL metric may open the possibility of quantitatively comparing maintainability of different projects, as well as monitoring architecture decay as software evolves.

2.2 Decoupling Level

Decoupling Level (DL) may be understood using several examples.

2.2.1 Rationale

Option theory suggests that a module with high option value may be small (easy to change), with high technical potential (active), and with few dependents. A software project clustered using the DRH algorithm allows assess to a software architecture in terms of its potential to generate option values because it explicitly identifies modules, their sizes, and how decoupled are they from each other. Decoupling Level (DL) may measure how well an architecture is decoupled into modules. Concretely, since DRH separates modules into layers, the DL may be calculated in each layer by considering all the modules within them. Since the modules in the last layer do not have any dependents, they may be treated differently.

2.2.2 Formal Definitions

We define #AllFiles as the total number of files in the system, and #Files(Mj) as the number of files within a DRH module, Mj. Given a DRH with n layers, its Decoupling Level (DL) is equal to the sum of the DL of all the layers:

$$DL = \sum_{L_i=1}^{n} DL_{L_i} \qquad (14)$$

Since the last layer of a DRH is special (in that it contains truly independent modules that can be replaced or changed without influencing any other parts of the system) we calculate the DL for the last layer differently. For an upper layer Li, (i<n) with k modules, we calculate its DL as follows:

$$DL_{L_i} = \sum_{j=1}^{k} \left[ \frac{\#\text{Files}(M_j)}{\#AllFiles} \times \left(1 - \frac{\#Deps(M_j)}{\#LowerLayerFiles}\right) \right] \qquad (15)$$

where, #Deps(Mj) is the number of files within lower layer modules that directly or indirectly depend on Mj. If a module influences all other files directly or indirectly in lower layers, its DL is 0; the more files it influences in lower layers, the lower its DL; the larger a module, the more likely it will influence more files in the lower layer, and hence the lower its DL. Based on the definition of DRH, a module in upper layers must influence some files in lower layers.

The DL of the last layer, Ln, may be calculated based on the following rationale: the more modules in last layer, and the smaller each module, the better the system can support module-wise evolution. In earlier exploration of Independence level (IL)—which only considers the proportion of files within the last layer—the inventors observed that, the better modularized a system is, the larger the proportion of files in the last layer. However, some very large modules in the last layer of some projects may skew the IL metric.

For some applications modules to be small. But how small? From the 41 projects used as part of the evaluation, the average number of files may be calculated in last layer modules and in all DRH modules. The results are 2.11 and 3.27 files respectively, meaning that the average DRH module has just a few files. People may comfortably process approximately 5 "chunks" of information at a time. Accordingly, consider a DRH module with 5 files or fewer to be a small module. If there are k modules in the last layer, Ln, then its DL is:

$$DL_{L_i=n} = \sum_{j=1}^{k} SizeFactor(M_j) \qquad (16)$$

If a module, Mj, has 5 files or fewer, we calculate its SizeFactor based on its relative size:

$$SizeFactor(M_j) = \frac{\#\text{Files}(M_j)}{\#AllFiles} \qquad (17)$$

If Mj has more than 5 files, a penalty may be added to reflect the limits of human cognitive capabilities:

$$SizeFactor(M_j) = \frac{\#Files(M_j)}{\#AllFiles} \times (\log_5(\#Files(M_j)))^{-1} \quad (18)$$

Figures 12A, 12B:
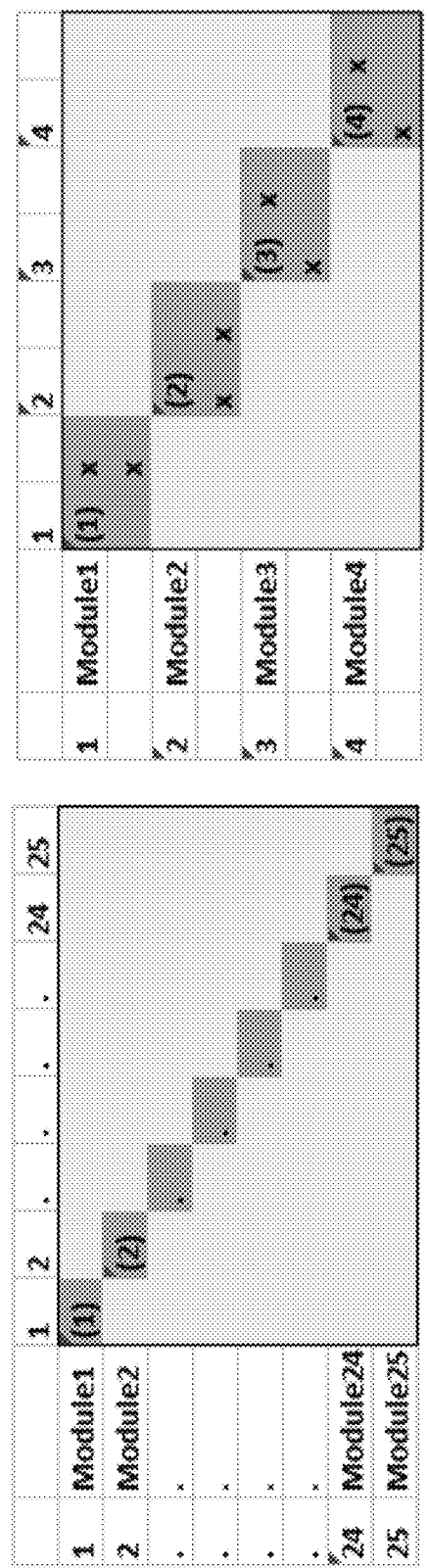
FIGS. 12(*a*)-(*d*) show decoupling examples.
Figures 12C, 12D:
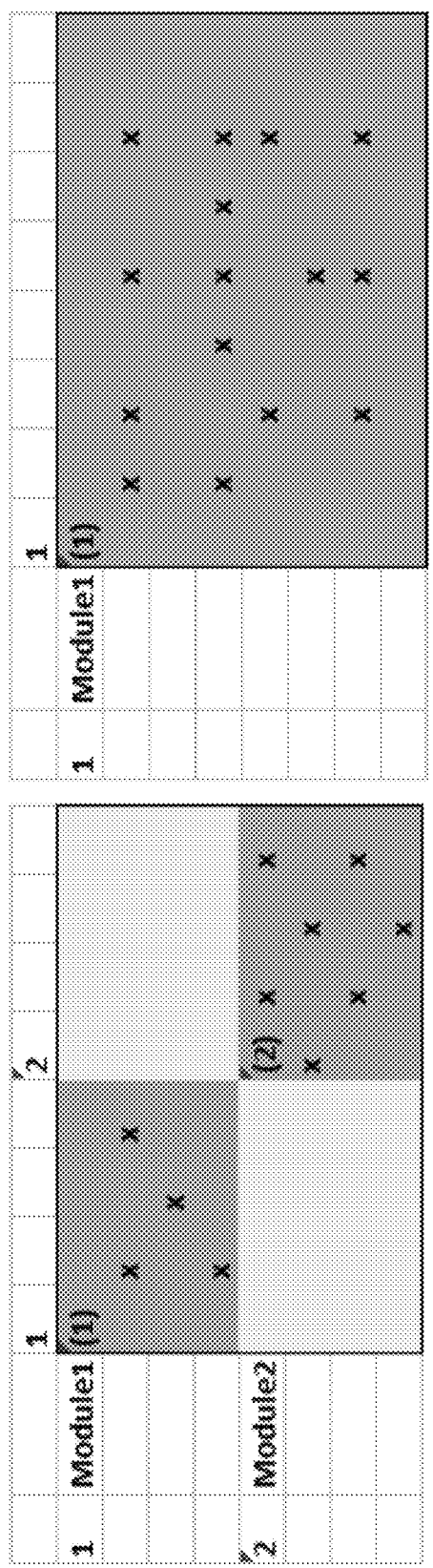

FIGS. 12a-d illustrate how the size of modules influences DL. Suppose a system only has 1 layer with 100 files. If they form 25 modules, each having 4 files, its DL is 100% (FIG. 12a), meaning that each module can improve its value by being replaced with a better version and thus increase the value of the whole system easily. As the size of each module grows, it becomes harder for them to change. If each module has 25 files (FIG. 12b), then its DL decreases to 50%, and then to 41% if each module has 50 files (FIG. 12c). If the 100 files only form one module, then it only has 35% DL (FIG. 12d). If the system only has 1 layer containing 1 module with multiple files, then its DL decreases with the number of files. If all the modules in the last layer have fewer than 5 files, then the DL of the last layer equals the proportion of lastlayer files to the total number of files, which is equivalent to the Independence Level metric. DL is, however, different from IL: first because it considers modules in all the layers, and second because it takes the size of a module into consideration.

2.2.3 An Example

Consider the example shown in FIG. 11 to illustrate how DL can manifest design quality. The three DSMs were reverse-engineered from three student submissions for the same class project used in a software design class. The students were given 10 weeks to create a questionnaire management system, so that a questionnaire designer can create either a survey or a test that can be graded, and a respondent can complete a given questionnaire.

The basic types of questions supported include multiple choice, true/false, matching, ranking, short answer, and essay. The software was to be designed for easy extension, such as adding new types of questions, adding a GUI in addition to a console UI, and supporting different display and printing formats. The students were supposed to achieve this objective by properly designing question and answer classes, and applying appropriate design patterns.

The three DSMs revealed drastically different designs for the same project. All three students designed an abstract Question class, to abstract the commonality among question classes. Since a true/false question can be seen as a special type of multiple-choice question, ranking is a type of matching, and short answer is a type of essay, both Submission 1 and Submission 3 have 3 types of question and corresponding answer classes. But Submission 1 has the highest DL, 82%, and Submission 3 has the lowest DL, 18%.

There are several major differences among these designs. First, both Survey Java in Submission 1 and 2, as well as Form Java in Submission 3 aggregate a collection of questions. In the first two designs, however, both Survey classes only interact with the Question base class. That is, as a design rule, Question decouples Survey from concrete question and answer classes, and each type of question and its answer classes form a module that can be changed independently. In Submission 3, however, Form depends on every question and answer class, leaving only two classes that can change independently: Survey and Test.

In addition, Submission 1 applied a bridge pattern correctly, so that the user can choose to use a TextFileUI or CommandLineUI at runtime, creating more independent modules. Submission 2 also attempted to apply a bridge pattern, but didn't do it correctly. In addition, although Submission 2 has 6 types of question and answer classes, they are not independent of each other. For example, the Ranking class extends the Matching class. Consequently, the DL of Submission 2 is lower than that of Submission 1.

2.2.4 Tool Support

A program may calculate Decoupling Level, which is integrated into Titan. The DL algorithm may take the following two inputs: 1) A DSM file that contains the dependency relations among files. Currently Titan creates DSM files from XML files generated from source code by a commercial reverse-engineering tool called Understand™. 2) A clustering file that contains the DRH clustering information of the files. Generating this file may use the DRH clustering function of Titan. Given these inputs, the tool may calculate the Decoupling Level of a software system.

2.3 Evaluation

DL may be evaluated based on how a metric should behave, using the concept of a centimeter—a commonly used metric—as an analogy. This may lead to the following questions:

(1): If Alice—a young girl—is measured two days in a row, her height measures should be the same, or very close to each other. An analogous research question is: if a project is being revised for a limited period of time, say, through a few releases, but doesn't go through major refactoring (for example, reorganizing the code base by applying some new architecture patterns), are the DL measures of these releases close to each other?

(2) If Alice measured 130 cm. and is subsequently measured one year later, one may expect her height to be significantly more than 130 cm. By analogy, a research question is: if a project is successfully refactored and its modularity has truly improved, will its DL reflect the improvement? Or if the architecture of a project has degraded over time, does its DL reflect this degradation?

Positive answers to the above two questions imply that it is possible to quantitatively monitor architecture degradation or assess the quality of refactoring using the DL metric.

(3) If Alice measures 130 cm. tall, and *Bella* measures 140 cm., *Bella* is taller than Alice. An analogous question is: if project A has a higher DL than project B, is project A more maintainable than project B?

A positive answer to this question means that it is possible to quantitatively compare the maintainability of different projects or different designs for the same project. If 130 cm. is above the 50th percentile for a girl of Alice's age, her mom would know that her height is "above average." Similarly, if one can measure the DL for a large number of projects, perhaps considering project characteristics and domains, a manager could compare to this dataset and determine the "health" status of a specific project, from a maintainability perspective.

Since both propagation cost (PC) and independence level (IL) aim to measure software architecture in terms of maintainability, one would like to know whether DL is more reliable than PC and IL. Therefore one will investigate the first three questions using DL, PC and IL comparatively.

Because analyzing multiple versions of the same project to answer (1) and (2), call this vertical evaluation. For (3), one need to compare different projects with various domains, sizes, and ages, and so we call this horizontal Evaluation (Section 2.3.3). Section 2.3.1 presents the measures extracted from 129 projects, and Section 2.3.4 summarizes the results.

2.3.1 Subjects and their Metrics

To minimize the possible bias caused by specific project characteristics, such as domain or size, we randomly chose 108 open source projects from Open Hub1, and collected 21 industrial projects from 6 of our collaborators. Due to space limitations, we placed all the data on our website2. A brief inspection of this data shows that their domains, sizes, and implementation languages vary drastically.

To calculate the DL, PC, and IL values of these projects, the inventors chose the latest version of each project, downloaded its source code, and then reverse-engineered this code using Understand™, which can output an XML file containing all the file-level dependency information for a project. Given these XML files, the tool Titan was used to calculate the DSM files and DRH clustering files. Finally, for each project, the DL, PC, and IL values are calculated, based on the project's DSM and DRH clustering files.

Table 4 reports the statistics of these metric values obtained from the subjects. This table shows that the average DL of all open source projects and industrial projects are 60% and 54% respectively. Less than 20% of open source projects have a DL lower than 47% or higher than 75%, and these numbers are slightly lower for commercial projects. It also shows that the project with the best DL, 93%, is a commercial project, even though commercial projects have lower DL values in general.

The data in Table 4 will vary if we examine a wide variety of subjects; this is the expected behavior with all metrics. For example child growth charts differ for girls and boys, and vary with other factors, such as time and region.

TABLE 4

Metric Summary for 129 Projects

| Stats | Open Source (%) | | | Commercial (%) | | | All Projects (%) | | |
|---|---|---|---|---|---|---|---|---|---|
| | DL | PC | IL | DL | PC | IL | DL | PC | IL |
| Avg | 60 | 20 | 43 | 54 | 21 | 35 | 59 | 21 | 42 |
| Median | 58 | 18 | 41 | 56 | 20 | 28 | 57 | 18 | 40 |
| Max | 92 | 72 | 100 | 93 | 50 | 83 | 93 | 72 | 100 |
| Min | 14 | 2 | 12 | 15 | 2 | 9 | 14 | 2 | 9 |
| 20th Pt | 47 | 8 | 28 | 36 | 6 | 24 | 46 | 8 | 26 |
| 40th Pt | 55 | 14 | 37 | 46 | 17 | 26 | 54 | 15 | 37 |
| 60th Pt | 66 | 21 | 45 | 59 | 24 | 38 | 63 | 22 | 45 |
| 80th Pt | 75 | 34 | 55 | 65 | 35 | 46 | 75 | 34 | 54 |

Pt: Percentile

2.3.2 Vertical Evaluation

An evaluation was done to determine if these metrics were stable for multiple consecutive, non-refactoring releases. Little variation may be observed if a metric is reliable. After that, applying these metrics to a commercial project that experienced serious architectural problems over a long period of evolution may result in a significant refactoring to restore modularity.

2.3.2.1 The Stability of DL

To evaluate the stability of these metrics, 16 out of the 129 projects were selected, and a series of releases for each of them. The selection was based on the following criteria: a) each project should have at least 4 sprints, meaning that it is revised during the chosen time period; b) these multiple snapshots are consecutive, e.g., multiple sprints from the same release, and c) a major refactoring among these snapshots was unlikely, either based on our prior study or on our communication with the architects of these projects. 3 out of the 21 commercial projects (which we call Comm 1, Comm 2, and Comm 3) were chosen because it was known that there was no refactoring during these selected snapshots based on our communication with their architects, and they all have sufficiently long revision histories. 14 out of 108 open source projects were chosen because the inventors had analyzed their structure earlier, and had prior knowledge that these selected snapshots did not contain a major refactoring.

Table 5 reports the statistics of DL, PC and IL respectively. Take OpenJPA for example: even though the number of files increased from 2291 to 4314 during the 9 snapshots, its DL increased from 66% to 71%. The standard deviation and coefficient of variation (CV) of DL are only 1% and 2% respectively, meaning that even though it went through significant changes, its architecture, as reflected by DL, does not vary drastically. By contrast, the CVs of PC and IL are 24% and 7% respectively, meaning that these two metrics are more unstable. From the average CV values in the last line, we can observe that both DL and IL have similar, and much higher, stability than PC.

TABLE 5

Coefficient of Variation(CV) of DL, PC and IL

| | #Rls | Rls Range | #Fl Range | Avg DL | CV (%) | | |
|---|---|---|---|---|---|---|---|
| | | | | | DL | RC | IL |
| Avro | 10 | 1.4.0-1.7.6 | 226-426 | 80% | 3 | 12 | 6 |
| Camel | 9 | 2.2.0-2.11 | 4934-8974 | 83% | 1 | 8 | 2 |
| Cassandra | 7 | 0.7.1-2.0.8 | 509-1096 | 34% | 3 | 7 | 6 |
| CXF | 12 | 2.1.1-2.6.9 | 2861-4939 | 87% | 1 | 4 | 2 |
| Derby | 13 | 10.4-10.10 | 2388-2786 | 61% | 3 | 10 | 7 |
| Hadoop | 5 | 1.0.0-1.2.1 | 1981-2344 | 73% | 1 | 2 | 2 |
| Httpd | 4 | 2.2.0-2.4.6 | 236-370 | 62% | 1 | 8 | 2 |
| Mahout | 7 | 0.3-0.9 | 990-1376 | 92% | 1 | 12 | 2 |
| OpenJPA | 9 | 1.2.0-2.2.2 | 2291-4314 | 69% | 2 | 24 | 7 |
| PDFBox | 10 | 1.7.0-1.8.7 | 901-997 | 53% | 1 | 2 | 1 |
| Pig | 7 | 0.2.0-0.8.1 | 594-1106 | 45% | 1 | 3 | 2 |
| Tika | 8 | 1.0-1.7 | 392-550 | 81% | 1 | 3 | 4 |
| Wicket | 10 | 1.3.0-1.5.6 | 1879-2582 | 70% | 1 | 2 | 1 |
| Comm_1 | 6 | 1.01-1.06 | 1455-1523 | 76% | 3 | 5 | 5 |
| Comm_2 | 8 | 1.0.1-1.0.9 | 287-494 | 73% | 5 | 30 | 11 |
| Comm_3 | 20 | 12.2-14.8 | 5239-6743 | 80% | 3 | 52 | 13 |
| Avg(CV) | | | | | 2 | 12 | 5 |

2.3.2.2 The Variation of DL

To evaluate if non-trivial variation in a metric can faithfully indicate architecture variation, one needs to understand what happens to an architecture when the metric value increases or decreases considerably. Ideally, one would want to collect the "inflection" points from multiple projects, and talk to their architects to verify what happened between these snapshots where the metric value changes noticeably. Given time and resource constraints, finding such candidates from open source projects was unrealistic. For one project that the inventors recently studied, the architect shared only the refactored version. Its DL, PC, and IL values changed from 87%, 4%, 60% to 93%, 4%, 46% respectively.

For the other three projects, Comm 2 was refactored based on previous analysis, but the inventors no longer have access to it. Comm 3 is one of the best modularized projects the inventors analyzed: among its 21 snapshots over 3 years its DL value remained stable at around 80% (above the 85th percentile of all 129 projects) with a small standard deviation of 2%, and its average PC is as low as 2% with a 1% standard deviation.

Titan was used to detect architecture hotspots from Comm 3, but there were not any significant architecture issues. Its architect also confirmed that although this project was refactored to merge two subsystems, its architecture is well-maintained and hasn't experienced substantial maintenance difficulties. Project Comm 1, by contrast, exhibits a more typical evolution path. Table 6 displays the metric values for all 29 snapshots collected since 2009, and FIG. 13 depicts the trends of the three metrics over these snapshots. The DL value indicates 4 major inflection points where its value increased or decreased more than 10 points: (1) from version 0.10 to 1.01, the DL increased from 45% to 74%, (2) from 1.06 to 2.01, DL decreased from 78% to 68%, (3) from 2.11 to 2.12, DL decreased from 65% to 48%, and (4) from 2.21 to 3.01, its DL increased from 48% to 62%. FIG. 15 shows Table 6: 29 Snapshots of Comm 1.

By contrast, although both PC and IL reflect the first inflection point, the PC doesn't change in the other 3 points. That is, if one only considers PC as an architecture metric, it will indicate that the architecture didn't change at the 3 later points. IL missed the 3rd and 4th points, but indicates an architecture degradation from 2.18 to 2.19 where it dropped 10 points.

The inventors presented this data to the architects, and asked them what happened during these transitions. In other words, did the architecture actually improve when the DL increased, and did it degrade when the DL decreased? And did DL miss the 5th point, where IL indicates a degradation? Consider these inflection points.

Transition 1: From 0.10 to 1.01, all three metrics indicate a significant improvement. According to the architect, when version 0.10 was released, it had been evolving for a year as a prototype. From 0.10 to 1.01 (released in April 2010), the product was refactored significantly and multiple design patterns were applied for the purpose of transforming it into a commercial product. The architecture indeed improved significantly. The transferring and refactoring process was accomplished by September 2010 when the commercial project was released as version 1.06.

Transition 2: From 1.06 to 2.01, since the architecture was stable, the management was eager to add new features, which was the main objective in the next 3 years. During these 3 years, the developers were aware that, to meet deadlines, architecture debts were introduced and the project became harder and harder to maintain. The DL decreased from 77% to 68% and remained around 68% till 2.11 when the DL dropped to 65%. The PC values, by contrast, decreased only slightly.

Transition 3: From 2.11 to 2.12, a significant drop of DL from 65% to 48% occurred. Referring to the "healthy" chart formed by all 129 projects, the maintainability of this product decreased from the 80th percentile to around the 20th percentile. When presenting the data to the architect, unlike the previous two points when the DL changes were expected, this transition point was a small surprise: indeed there was a significant refactoring in 2.12 in which 5 new interfaces were introduced to decouple several highly coupled parts. This was the time when the developers were not able to tolerate the technical debt anymore, and decided to clean some of the architecture issues while continuing to add new features.

After adding the 5 new interfaces, the architect expected a significant improvement in 2.12, but the DL showed the opposite. The DRSpaces led by these 5 new design rules were examined and an attempt was made to understand them. It turns out that 4 out of the 5 new design rules had very minor impact, only influencing a few other files. The other new design rule, however, was influential, influencing 133 other files.

Examining the DRSpace formed by the 133 files, the inventors observed that these files were not as decoupled as the architect expected. There existed several large dependency cycles that should have been decoupled. The architect confirmed that, since this was a significant refactoring combined with the addition of new features, the refactoring wasn't completely finished by 2.12. Instead, the cycles observed in 2.12 were removed gradually from 2.12 to 2.21.

After examining the DSMs, the architect realized that not all cycles (that should have been removed) were completely removed. In summary, the surprising decrease of DL was caused by a significant, but incomplete refactoring: the new design rule introduced many more dependents, but not all the modules were decoupled as they should be, hence the significant decrease of DL.

Transition 4: From 2.21 to 3.01, there was a significant increase in DL but still not as high as the DL for 1.06 when the product was first refactored. The architect considered that the objective of 3.01 was to conform to a new third party library, and to improve unit testing. To do so, the major activities in 2.21 were "clean up," that is, reducing technical debt. Several big cycles we observed in 2.12 were completely decoupled in this process, which explains the increase of DL.

Transition 5: From 2.18 to 2.19, the architect wasn't able to recall any prominent architecture changes during this transition, meaning that IL reported a false positive. After our meeting, the architect confirmed that since the project has been accumulating debt for 4 years, not all architecture issues were completely solved. And they are again facing the dilemma: "Shall we refactor or keep adding new features?" The architect responded that the DSM analysis made it very clear where the debts are located and hence what should be done to remove them.

In summary, the inventors observed that, in this project, the variation of DL not only indicated successful refactoring and architecture degradation, but also revealed an unsuccessful major refactoring. Combined with the DSM analysis, the inventors were able to identify why the modules were not decoupled as expected. Neither of the other metrics could provide such insights.

2.3.3 Horizontal Evaluation

Horizontal evaluation aims to investigate if software systems with higher DLs are easier to maintain. The question is, how to measure maintainability? In this section, a suite of maintainability measures may be extracted from the revision history of a software system.

2.3.3.1 Maintainability Measures

Maintainability may be measured by the effort, in terms of time, spent on each task. But such data may be difficult to obtain. The inventors thus propose a suite of maintainability measures that can be extracted from software revision history, illustrating the rationale using the 4 cases depicted in FIGS. 14(a)-(c).

Suppose there are three committers for a project, and each of them committed one revision, each changing a set of files. If each of the committers changed completely different sets of files (FIG. 14a), it means that these files can be changed independently and in parallel, and it is unlikely that the committers need to spend effort communicating with each other. On the other extreme, if all three committers changed exactly the same set of files (FIG. 14d), these files cannot be changed in parallel, and it is likely that the committers have to communicate to resolve conflicts. If these are bug-fixing changes, then the first case implies that the bugs were localized and separated, while the second case implies that all the bugs are in the same set of files. In the first case, these files have best maintainability, and the second case the worst maintainability. The following measures to quantify maintainability from the revision history of a project may be considered.

(1) Commit Overlap Ratio (COR): measures to what extent changes made to files are independent from each other. That is, the total number of files revised in all commits, divided by the number of distinct files:

$$CommitOverlapRatio = \frac{\sum_{1}^{m}|FC_i|}{|FC_1 \cup FC_2 \cup ... \cup FC_m|} \quad (19)$$

Where m is the total number of commits, $|FC_i|$, i=1, 2, ..., m, is the number of files changed in Commit$i$, and $|FC_1 \cup FC_2 ... FC_m|$ is the total number of distinct files involved in all commits. In FIGS. 14(a)-(d), the same set of files, indicating that these files are harder to maintain. One may further distinguish COR for bug-fixing only commits and all commits using BCOR and CCOR respectively.

(2) Commit Fileset Overlap Ratio (CFOR): measures to what extend the filesets managed by different committers overlap. Suppose that a committer, Ci, makes multiple commits, and FSi is the set of files she revised in all the commits, then we calculate CFOR for all the committers as follows:

$$CFOR = \frac{\sum_{1}^{m}|FS_i|}{|FS_1 \cup FS_2 \cup ... \cup FS_m|} \quad (20)$$

Where m is the number of committers, and the denominator is the total number of distinct files committed by all the committers. The larger the CFOR, the fewer files can be changed in parallel by different committers, indicating lower maintainability. We similarly distinguish CFOR for bug-fixing and all commits using BCFOR and CCFOR respectively.

3. Pairwise Committer Overlap (PCO): measures the likelihood two committers have to communicate with each other to resolve conflicts. Suppose committer Ca changed fileset, $FS_a$, and committer $C_b$ changed fileset, $FS_b$. One my measure their communication need as the number of files they both changed, divided by the total number of files changed by either of them. For each committer $C_i$, one thus calculates potential interaction with all other committers as:

$$CommitterOverlap_i = \sum_{j}^{m} \frac{|FS_i \cap FS_j|}{|FS_i \cup FS_j|} \quad (21)$$

where i≠j and m is the number of committers. Then Pairwise Committer Overlap (PCO) as the average of CommitterOverlap among all committers may be defined. The higher the number, the more likely the committers have to communicate. In FIGS. 14(a)-(d), the PCO of Case 1 is 0, meaning that there is no need to communicate at all. Case 2 and Case 3 have the same COR and CFOR, but in Case 3, p3 may need to talk to both p1 and p2, hence Case 3 has higher PCO. In Case 4, each committer may have to talk to 2 other committers (PCO=2). PCO into BPCO (for bug-fixing commits) may be distinguished from CPCO (for all commits).

2.3.3.2 Evaluation Strategy

For a fair evaluation, one may first chose a set of projects of various sizes and domains, each having multiple maintainers, being well managed using proper version control and issue tracking systems, where most commits are explicitly linked with issues. More importantly, none of these projects may go through significant architecture or design level refactoring. Given these projects, one may measure DL values from their earlier versions that reflect a settled design, then monitor and collect their maintenance measures for a long enough period of time to generate a statistically valid sample set. Ideally, these projects should have similar number of changes and bug fixes of similar levels of complexity, comparing if higher DL values indeed correlate with lower maintenance effort.

The inventors decided to investigate as many projects as they could and include all the history of each to minimize the differences caused by the number of revisions. Which release the DL, PC, and IL should be measured may not indicate a settled design and thus measurement of multiple snapshots of each project and calculation of the average values may be done. Average DL may faithfully reflect the architecture of a project, according to the stability analysis, and from the fact that large scale refactorings in open source projects may be rare but using average PC may be less realistic, because PC may vary drastically even for versions known to be stable, making it a less-qualified architecture measure. To make a fair comparison, however, calculation of the average PC for each project may be done with calculation of the correlation between average DL, PC, and DL on the one hand, and project maintainability measures on the other hand.

2.3.3.3 Horizontal Evaluation Subjects 38 out of the 108 open source projects and 3 out of the 21 commercial projects were chosen as the subjects for horizontal evaluation. As shown in Table 7, these projects are implemented using different languages, and have different sizes, ages, and domains. The inventors chose those projects, rather than using all 129 projects mainly because their revision histories are well managed using well-known tools from which they could extract data. More importantly, in these projects, the inventors are able to extract the linkage between commits and issues reliably. In other words, most committers in these projects labeled their commits with the ID of the issue that it addresses to distinguish hug-fixing commits from other changes.

TABLE 7

Horizontal Evaluation Subjects

| #Projects: | 41 | Languages: | java, c, c++, c# |
|---|---|---|---|
| #Files: | 63-11130 | CLOC: | 10k-2.7M |
| #Committers: | 18-915 | #Commits: | 346-74269 |

For each snapshot of each project, the inventors downloaded the source code, reverse-engineered the code, transformed the dependency file output by Understand™ into a DSM file using Titan, and generated its DRH clustering file. Using the DSM and DRH clustering files, we computed each DL, PC and IL, and calculated their averages over multiple snapshots. Section 2.3.3.1 shows the revision history of each project to extract maintainability measures.

2.3.3.4 Analysis

Given the following maintainability measures—Change Commit Overlap Ratio (CCOR), Bug Commit Overlap Ratio (BCOR), Change Commit Fileset Overlap Ratio (CC- FOR), Bug Commit Fileset Overlap Ratio (BCFOR), Pairwise Committer Overlap, based on both all Changes (CPCO) and bug-fixing commits (BPCO), the inventors conducted a Pearson Correlation Analysis between them and DL, PC and IL respectively, reporting the results in Table 8.

TABLE 8

Pearson Correlation Analysis

|    | CCOR  | BCOR  | CCFOR | BCFOR | CPCO  | IBPCO |
|----|-------|-------|-------|-------|-------|-------|
| DL | −0.76 | −0.78 | −0.70 | −0.71 | −0.66 | −0.64 |
| PC | 0.70  | 0.63  | 0.70  | 0.63  | 0.51  | 0.49  |
| IL | −0.45 | −0.41 | −0.45 | −0.41 | −0.41 | −0.32 |

This table shows that these measures have the highest negative correlation with DL, meaning the higher the DL, the better the maintainability. IL similarly showed negative correlation but the correlation was much weaker than with DL. PC displays positive correlation with these maintenance measures, meaning that the more tightly coupled a system is, the harder it is to maintain. Although PC has relatively high correlation with CCOR, BCOR, CCFOR, BCFOR, its correlation with CPCO and BPCO are much lower, meaning that this coupling measure is less correlated with how well people can make changes independently from each other.

2.3.4 Evaluation Summary

Compared with PC and IL, DL appears to be a more reliable metric in that it remains stable over subsequent releases, reveals architecture degradation and major refactorings, and has significant correlations with maintenance measures.

While this invention has been described with reference to architectural and technical debt measurement within software programs, it may extend to manufacturing, business interaction, people management, and other applications where projects develop and evolve, and potentially become a source of error.

While the invention has been described with reference to the embodiments above, a person of ordinary skill in the art would understand that various changes or modifications may be made thereto without departing from the scope of the claims.

The invention claimed is:

1. A computer-implemented method for improving a computer program's quality, the computer-implemented method comprising:
   identifying the computer program's quality corresponding to a measure of the computer program's maintainability, wherein the computer program's maintainability is measured using a decoupling level metric corresponding to how the computer program can be decoupled into small and independently replaceable modules, wherein the decoupling level metric for the computer program is automatically computed based on at least two inputs: (1) a dependency file comprising dependency relations among modules of the computer program; and (2) a clustering file that contains design rule hierarchy (DRH) clustering information for the modules of the computer program, wherein the DRH clustering information for the modules of the computer program comprises information regarding the small and independently replaceable modules in a layer within a hierarchical structure of the DRH, wherein the decoupling level metric for the computer program is automatically computed for a layer within the hierarchical structure of the DRH based on all the small and independently replaceable modules within the layer of the hierarchical structure of the DRH, and wherein the decoupling level metric for the computer program depends on a size of the small and independently replaceable modules;
   generating the dependency file and the clustering file as the at least two inputs to automatically compute the decoupling level metric for the computer program;
   monitoring degradation of an architecture of the computer program over time based on the decoupling level metric for the computer program; and
   performing maintainability tasks for the computer program to avoid degradation of the architecture of the computer program over time.

2. The computer-implemented method of claim 1, wherein improved maintainability corresponds with a higher number of the small and independently replaceable modules than a number of the small and independently replaceable modules absent the improved maintainability.

3. The computer-implemented method of claim 1, wherein improved maintainability corresponds with a smaller file size of the small and independently replaceable modules than a file size of the small and independently replaceable modules absent the improved maintainability.

4. The computer-implemented method of claim 1, wherein the decoupling level metric corresponding to how the computer program can be decoupled into the small and independently replaceable modules is defined as a decoupling level and the small and independently replaceable modules are separated into layers, and wherein the decoupling level is a sum of all decoupling levels of the separated layers.

5. The computer-implemented method of claim 1, wherein the dependency file is a design structure matrix (DSM) file.

6. The computer-implemented method of claim 1, wherein the dependency file is generated from a computer program source code.

7. The computer-implemented method of claim 6, wherein the computer program source code is reverse engineered.

8. The computer-implemented method of claim 1, wherein the decoupling level metric for the computer program comprises a sum of decoupling level metrics for layers within the computer program.

9. The computer-implemented method of claim 1, further comprising:
   measuring maintainability of a plurality of different computer programs;
   comparing maintainability of the plurality of different computer programs; and
   determining a health status of a specific computer program among the plurality of different computer programs based on a result of the comparison.

* * * * *